(12) United States Patent
Takae et al.

(10) Patent No.: US 10,131,306 B2
(45) Date of Patent: Nov. 20, 2018

(54) TRAVEL CONTROL METHOD AND TRAVEL CONTROL APPARATUS

(71) Applicant: Nissan Motor Co., Ltd., Yokohama-shi, Kanagawa (JP)

(72) Inventors: Yasuhiko Takae, Kanagawa (JP); Tatsuya Shino, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/748,070

(22) PCT Filed: Jul. 28, 2015

(86) PCT No.: PCT/JP2015/071414
§ 371 (c)(1),
(2) Date: Jan. 26, 2018

(87) PCT Pub. No.: WO2017/017797
PCT Pub. Date: Feb. 2, 2017

(65) Prior Publication Data
US 2018/0222423 A1  Aug. 9, 2018

(51) Int. Cl.
*G06K 9/00* (2006.01)
*G08G 1/16* (2006.01)
(Continued)

(52) U.S. Cl.
CPC .......... *B60R 21/0134* (2013.01); *B60R 21/00* (2013.01); *B60W 30/18163* (2013.01); *B60W 40/105* (2013.01); *G06K 9/00798* (2013.01); *G08G 1/166* (2013.01); *G08G 1/167* (2013.01); *B60R 2300/804* (2013.01); *B60W 2550/10* (2013.01); *B60Y 2300/18166* (2013.01)

(58) Field of Classification Search
CPC ................ B60R 21/0134; B60R 21/00; B60R 2300/804; G08G 1/166; G08G 1/167; B60W 30/18163; B60W 40/105; B60W 2550/10; G06K 9/00798; B60Y 2300/18166
See application file for complete search history.

(56) References Cited

U.S. PATENT DOCUMENTS

2005/0195383 A1  9/2005 Breed et al.
2008/0033614 A1* 2/2008 Schiehlen ............ B62D 15/025
                                                  701/41
(Continued)

FOREIGN PATENT DOCUMENTS

EP  2042399 A2  4/2009
JP  H11120498 A  4/1999
(Continued)

*Primary Examiner* — Michael J Zanelli
(74) *Attorney, Agent, or Firm* — Young Basile Hanlon & MacFarlane, P.C.

(57) ABSTRACT

A travel control method comprises detecting a travel state of the subject vehicle including a position and a speed of the subject vehicle, acquiring obstacle information including a position and a speed of the obstacle, estimating the second range after a predetermined time on the basis of the travel state of the subject vehicle and the obstacle information, and announcing announcement information that the second range will become small to a driver of the subject vehicle when the second range is estimated to become small after the predetermined time.

7 Claims, 27 Drawing Sheets

(51) Int. Cl.
    *B60R 21/00*     (2006.01)
    *B60W 30/18*     (2012.01)
    *B60W 40/105*     (2012.01)
    *B60R 21/0134*     (2006.01)

(56) References Cited

U.S. PATENT DOCUMENTS

| | | |
|---|---|---|
| 2009/0088925 A1 | 4/2009 | Sugawara et al. |
| 2009/0096634 A1 | 4/2009 | Emam et al. |
| 2011/0130936 A1 | 6/2011 | Noda |
| 2011/0293145 A1 | 12/2011 | Nogami et al. |
| 2012/0004835 A1 | 1/2012 | Sato |
| 2012/0078500 A1 | 3/2012 | Yamada et al. |
| 2015/0145694 A1 | 5/2015 | Dupont |
| 2016/0272199 A1* | 9/2016 | Kawahara ............. B60W 30/16 |

FOREIGN PATENT DOCUMENTS

| | | |
|---|---|---|
| JP | 2011113511 A | 6/2011 |
| JP | 2015060300 A | 3/2015 |
| WO | 2010082353 A1 | 7/2010 |

\* cited by examiner

FIG. 2

| Travel scene | Determination condition | Direction of lane change | Necessity level of lane change | Time limit |
|---|---|---|---|---|
| Scene of catching up with preceding vehicle | "Preceding vehicle exists ahead" and "Vehicle speed of preceding vehicle < Set vehicle speed of subject vehicle" and "Subject vehicle will reach preceding vehicle within predetermined time" and "Direction of lane change is not under lane change prohibition condition" | Toward overtaking lane side | X1 | Time-to-contact with preceding vehicle − α |
| Scene of approaching tollgate | "Time for arriving at tollgate located ahead is less than 60 seconds" and "Direction of lane change is not under lane change prohibition condition" | Toward empty toll gate booth side | X2 | Time for arriving at tollgate − α |
| Scene of approaching merging point | "Time for arriving at merging point located ahead is less than predetermined time" and "Direction of lane change is not under lane change prohibition condition" | Toward opposite side to merging lane | X3 | Time for arriving at merging point − α |
| Obstruction scene of subject vehicle's lane | "Travel lane of subject vehicle will disappear within predetermined distance" and "Direction of lane change is not under lane change prohibition condition" | Toward unobstructed lane side | X4 | Time for arriving at obstructed point − α |
| Scene of avoiding object on road | "Pedestrian, bicycle, motorcycle, or fallen object on road exists ahead" and "Direction of lane change is not under lane change prohibition condition" | Toward unoccupied lane side | X5 | Time for arriving at object on road − α |
| Scene of being caught up by vehicle from behind | "Following vehicle exists in travel lane of subject vehicle" and "Vehicle speed of following vehicle > Vehicle speed of subject vehicle" and "Following vehicle will reach subject vehicle within predetermined time" and "Direction of lane change is not under lane change prohibition condition" | Toward opposite side to overtaking lane | X6 | Time-to-contact of subject vehicle with following vehicle − α |
| Emergency evacuation scene | "Onboard equipment is not operated within predetermined time" and "Driver is determined to be incapable of driving" and "Direction of lane change is not under lane change prohibition condition" | Toward road shoulder side | X7 | None |
| Scene of lane transfer toward destination | "Destination is set" and "Time for arriving at lane change point is within predetermined time" and "Direction of lane change is not under lane change prohibition condition" | Toward lane side for heading to destination | X8 (X1<X8) | Time for arriving at lane change point − α |
| Scene of heading to SA/PA | "Time for arriving at SA/PA is within predetermined time" and "Elapsed time after previous rest is predetermined time or more" and "Direction of lane change is not under lane change prohibition condition" | Toward lane side near SA/PA | X9 | Time for arriving at SA/PA − α |

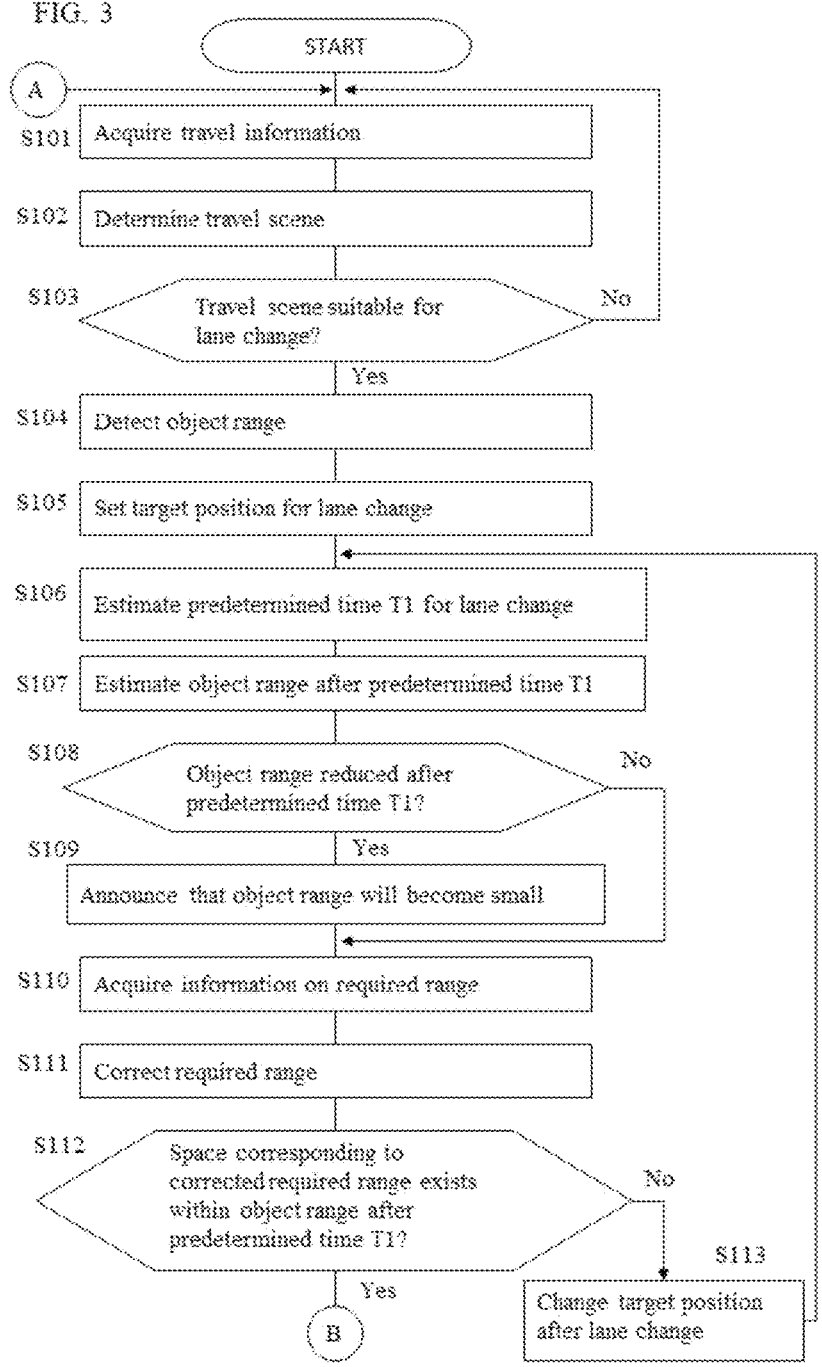

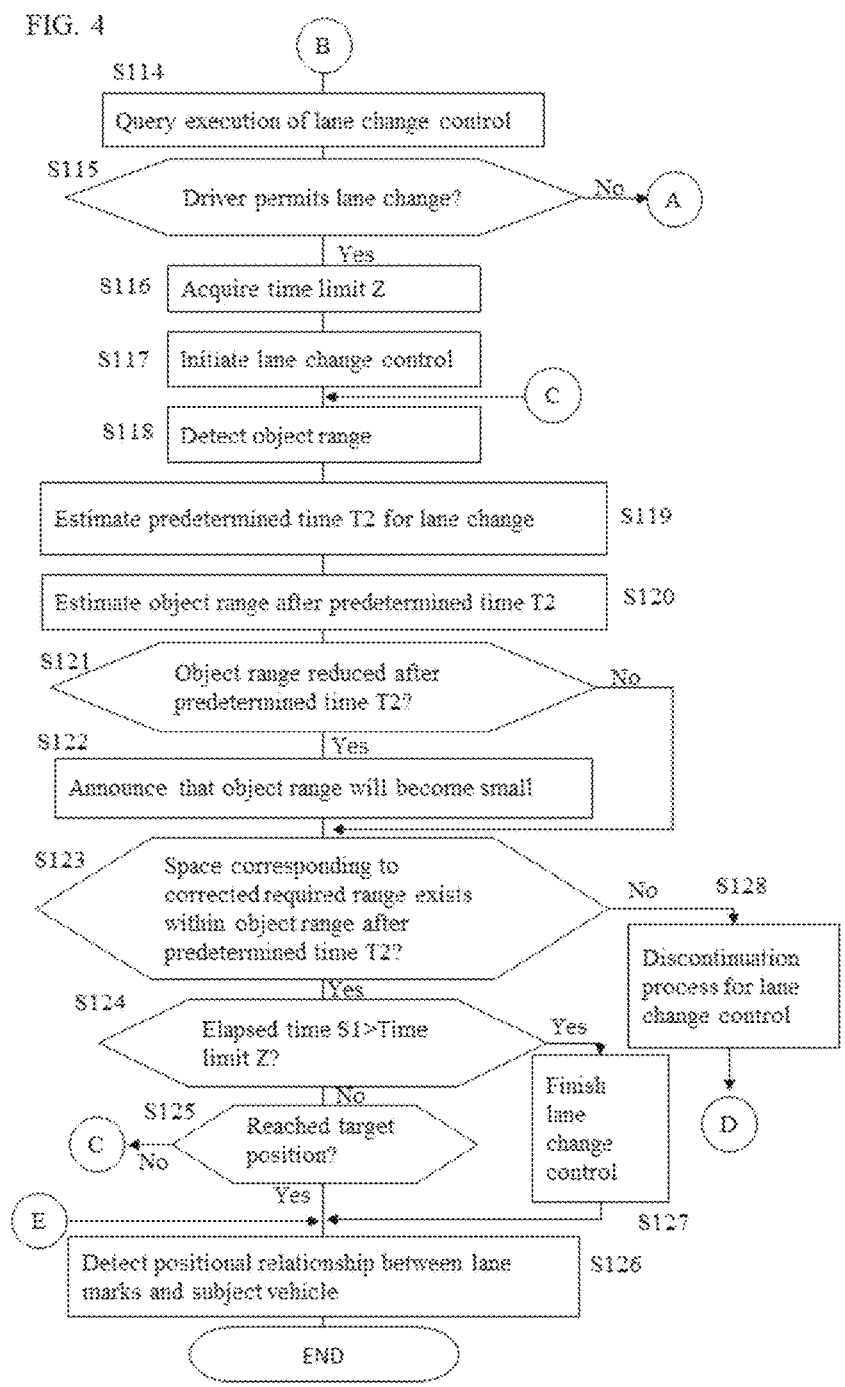

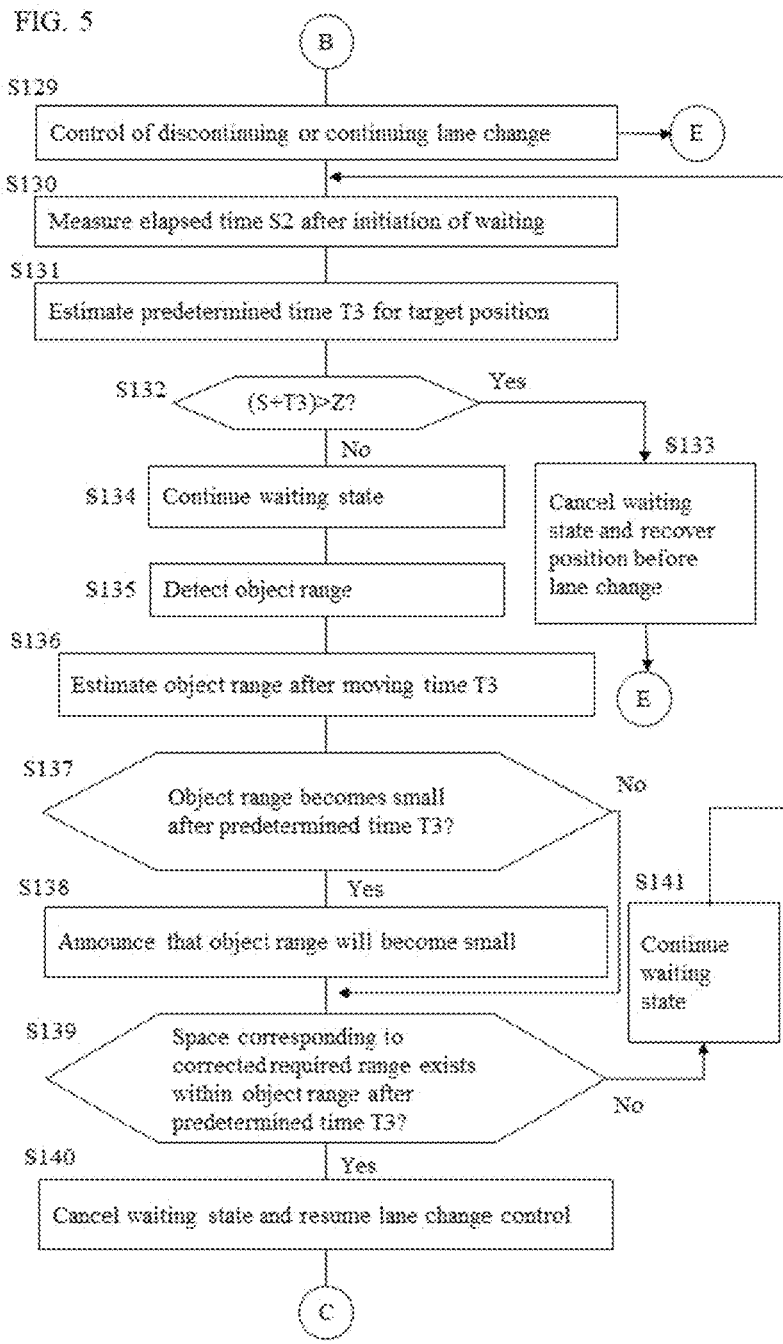

TRAVEL CONTROL METHOD AND TRAVEL CONTROL APPARATUS

TECHNICAL FIELD

The present invention relates to a travel control method and a travel control apparatus for controlling travel of a subject vehicle.

BACKGROUND

Travel control apparatuses for automatically performing lane change of a vehicle have been conventionally known. Such a travel control apparatus may use a known technique of determining whether or not a space for lane change exists in an adjacent lane to the lane in which the subject vehicle travels and executing the lane change when the space for lane change exists in the adjacent lane (see WO2010/082353).

In the above conventional technique, when a space for lane change does not exist in the adjacent lane, the lane change is not performed but, unfortunately, the driver cannot perceive the reason that the lane change is not performed. In particular, if lane change is not performed for the reason that a space for lane change exists in the adjacent lane at the present time but the space for lane change will disappear from the adjacent lane after a time required for lane change, uncomfortable feeling may be given to the driver who expects lane change.

SUMMARY

A problem to be solved by the present invention is to provide a travel control method and a travel control apparatus that are able to appropriately announce the reason of determination whether lane change should be performed to the user.

The present invention includes specifying a first lane in which the subject vehicle travels and a second lane adjacent to the first lane and detecting a range in the second lane as a second range. The range in the second lane is located at a side of the subject vehicle, and no obstacles exist in the range in the second lane. The above problem is solved by estimating the second range after a predetermined time on the basis of a travel state of the subject vehicle and information on an obstacle around the subject vehicle and announcing announcement information that the second range will become small to a driver of the subject vehicle when the second range is estimated to become small after the predetermined time.

According to the present invention, when the second range is estimated to become small after the predetermined time, the announcement information that the second range will become small is announced to the driver of the subject vehicle. Thus, even when lane change is not performed, the driver can appropriately perceive the reason that lane change is not performed.

BRIEF DESCRIPTION OF THE DRAWINGS

FIG. 2 is a view illustrating an example of a table used for determination of a travel scene;

FIG. 3 is a flowchart (part 1) illustrating a lane change control process according to a first embodiment of the present invention;

FIG. 4 is a flowchart (part 2) illustrating the lane change control process according to the first embodiment of the present invention;

FIG. 5 is a flowchart (part 3) illustrating the lane change control process according to the first embodiment of the present invention;

DETAILED DESCRIPTION OF THE EMBODIMENTS

Hereinafter, one or more embodiments of the present invention will be described with reference to the drawings. In the embodiments, a travel control apparatus equipped in a vehicle will be exemplified and described.

First Embodiment

Figure 1:
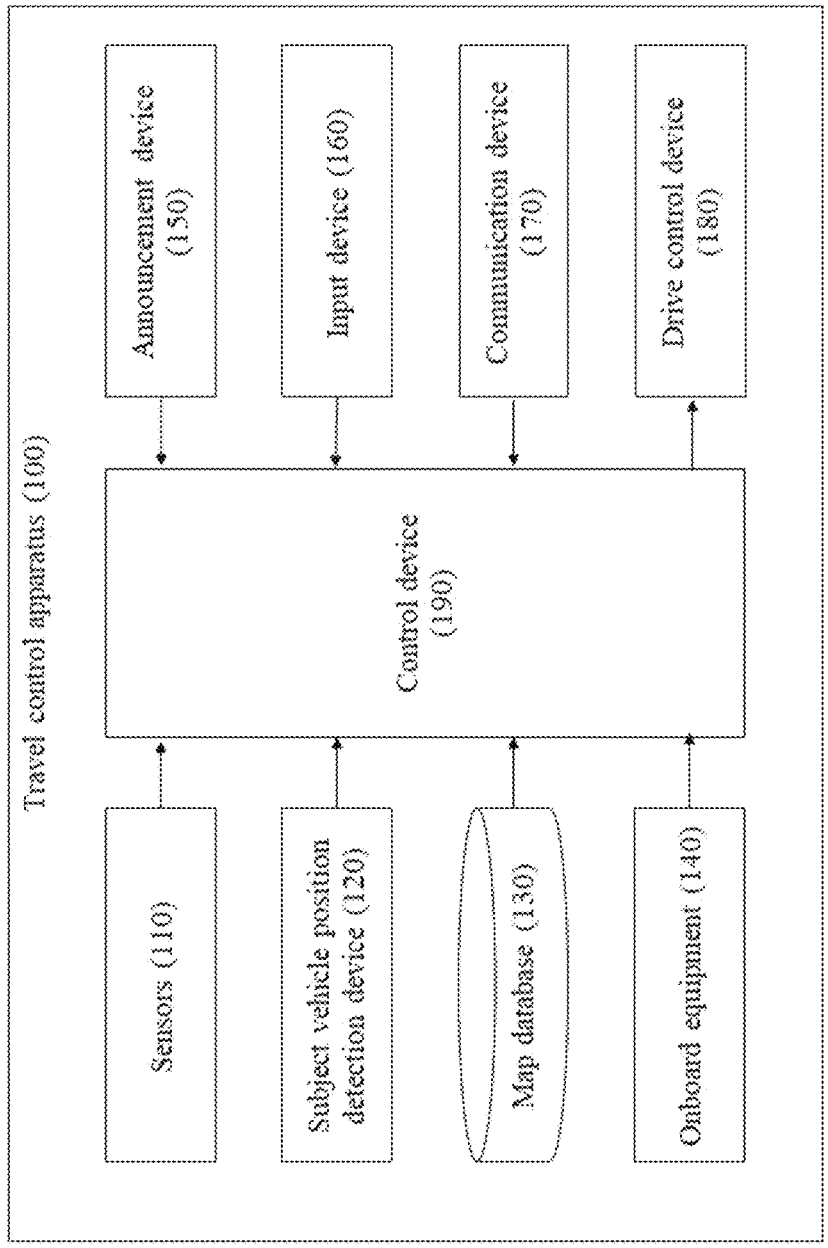
FIG. 1 is a block diagram illustrating the configuration of a travel control apparatus according to one or more embodiments of the present invention.

FIG. 1 is a block diagram illustrating the configuration of a travel control apparatus 100 according to the present embodiment. As illustrated in FIG. 1, the travel control apparatus 100 according to the present embodiment has a set of sensors 110, a subject vehicle position detection device 120, a map database 130, onboard equipment 140, an announcement device 150, an input device 160, a communication device 170, a drive control device 180, and a control device 190. These devices are connected to one another via a controller area network (CAN) or other in-vehicle LAN for mutually exchanging information.

The sensors 110 detect a travel state of the subject vehicle. Examples of the sensors 110 include a front camera that captures images ahead of the subject vehicle, a rear camera that captures images behind the subject vehicle, a front radar that detects obstacles ahead of the subject vehicle, a rear radar that detects obstacles behind the subject vehicle, side radars that detect obstacles existing at sides of the subject vehicle, a vehicle speed sensor that detects the vehicle speed of the subject vehicle, and an in-vehicle camera that captures images of the driver. The sensors 110 may be represented by one of the above-described various sensors or may also be configured with a combination of two or more sensors. The detection results of the sensors 110 are output to the control device 190.

The subject vehicle position detection device 120 is composed of a GPS unit, a gyro-sensor, a vehicle speed sensor, and other necessary components. The subject vehicle position detection device 120 detects radio waves transmitted from a plurality of communication satellites using the GPS unit to periodically acquire positional information of a target vehicle (subject vehicle) and detects the current position of the target vehicle on the basis of the acquired positional information of the target vehicle, angle variation information acquired from the gyro-sensor, and the vehicle speed acquired from the vehicle speed sensor. The positional information of the target vehicle detected by the subject vehicle position detection device 120 is output to the control device 190.

The map database 130 stores map information that includes positional information of various facilities and specific points. Specifically, the map database 130 stores positional information of merging points, branching points, tollgates, positions at which the number of lanes decreases, service areas (SA)/parking areas (PA), etc. together with the map information. The control device 190 can refer to the map information stored in the map database.

The onboard equipment 140 includes various modules equipped in the vehicle and can be operated by the driver. Examples of such onboard equipment include a steering, an accelerator pedal, a brake pedal, a navigation device, an audio device, an air conditioner, a hands-free switch, power windows, wipers, lights, flashers, and a horn. When the driver operates the onboard equipment 140, its information is output to the control device 190.

The announcement device 150 may be, for example, a device such as a display of a navigation device, a display incorporated in a rearview mirror, a display incorporated in a meter unit, a head-up display projected on a windshield, and a speaker of an audio device. The announcement device 150 announces announcement information, which will be described later, to the driver under the control by the control device 190.

The input device 160 may be, for example, a device such as a dial switch and a touch panel disposed on a display screen that allow input by the driver's hand operation and a microphone that allows input by the driver's voice. In the present embodiment, the driver can operate the input device 160 thereby to input response information in response to the announce information which is announced by the announcement device 150. For example, in the present embodiment, switches of flashers or other onboard devices can also be used as the input device 160. More specifically, the input device 160 may be configured such that the driver turns on the switch of a flasher thereby to input permission of lane change in response to a query as to whether or not to automatically perform lane change. The response information input via the input device 160 is output to the control device 190.

The communication device 170 performs communication with communication equipment located outside the vehicle. For example, the communication device 170 performs vehicle-to-vehicle communication with another vehicle, performs road-to-vehicle communication with equipment provided at a road shoulder, or performs wireless communication with an information server provided outside the vehicle and can thereby acquire various items of information from the external equipment. The information acquired by the communication device is output to the control device 190.

The drive control device 180 controls travel of the subject vehicle. For example, when the subject vehicle follows a preceding vehicle (this operation is referred to as "follow-up travel control," hereinafter), the drive control device 180 controls the operation of a drive mechanism (which includes the operation of an internal-combustion engine in the case of an engine car and the operation of an electric motor in the case of an electric car and further includes the torque distribution for an internal-combustion engine and electric motor in the case of a hybrid car) and the braking operation to achieve the acceleration, deceleration and vehicle speed so that the distance between the subject vehicle and the preceding vehicle can be maintained at a constant distance. When the subject vehicle performs lane change such as overtaking of a preceding vehicle (this operation is referred to as "lane change control," hereinafter), the drive control device 180 controls the operation of a steering actuator to control the operation of wheels and thereby executes the turning control of the subject vehicle. The drive control device 180 controls travel of the subject vehicle in accordance with commands from the control device 190, which will be described later. Other well-known methods can also be used as a travel control method by the drive control device 180.

The control device 190 is composed of a read only memory (ROM) that stores programs for controlling travel of the subject vehicle, a central processing unit (CPU) that executes the programs stored in the ROM, and a random access memory (RAM) that serves as an accessible storage device. As substitute for or in addition to the CPU, a micro processing unit (MPU), digital signal processor (DSP), application specific integrated circuit (ASIC), field programmable gate array (FPGA), or the like can also be used.

The control device 190 executes the programs stored in the ROM using the CPU thereby to achieve a travel information acquisition function to acquire information regarding a travel state of the subject vehicle, a travel scene determination function to determine a travel scene of the subject vehicle, a travel control function to control travel of the subject vehicle, and a lane change control function to control lane change through a determination as to whether or not lane change should be performed. Each function of the control device 190 will be described below.

The control device 190 uses the travel information acquisition function to acquire the travel information regarding the travel state of the subject vehicle. For example, the control device 190 can use the travel information acquisition function to acquire the external image information around the vehicle captured by the front camera and rear camera and/or the detection results by the front radar, rear radar, and side radars as the travel information. The control device 190 can also use the travel information acquisition function to acquire the vehicle speed information of the subject vehicle detected by the vehicle speed sensor and/or the image information of the driver's face captured by the in-vehicle camera as the travel information.

The control device 190 can use the travel information acquisition function further to acquire information on the current position of the subject vehicle from the subject vehicle position detection device 120 as the travel information and also to acquire positional information of merging points, branching points, tollgates, positions at which the number of lanes decreases, service areas (SA)/parking areas (PA), etc. from the map database 130 as the travel information. In addition, the control device 190 can use the travel information acquisition function to acquire information on the operation of the onboard equipment 140 by the driver from the onboard equipment 140 as the travel information.

The control device 190 uses the travel scene determination function to refer to a table stored in the ROM of the control device 190 to determine the travel scene in which the subject vehicle is traveling. FIG. 2 is a view illustrating an example of the table used to determine the travel scene. As illustrated in FIG. 2, the table stores a travel scene suitable for lane change and its determination condition for each travel scene. The control device 190 uses the travel scene determination function to refer to the table illustrated in FIG. 2 to determine whether or not the travel scene of the subject vehicle is a travel scene suitable for lane change.

For example, in the example illustrated in FIG. 2, the determination condition for a "scene of catching up with a preceding vehicle" is defined by four conditions: a condition of "detecting a preceding vehicle ahead," a condition of "the vehicle speed of the preceding vehicle<the vehicle speed of the subject vehicle," a condition of "reaching the preceding vehicle within a predetermined time," and a condition that "the direction of lane change is not under a lane change prohibition condition." The control device 190 uses the travel scene determination function to determine whether or not the subject vehicle satisfies the above conditions, for example, on the basis of the detection results by the front camera and/or front radar, the vehicle speed of the subject vehicle detected by the vehicle speed sensor, the positional information of the subject vehicle, etc. When the above conditions are satisfied, the travel scene determination function is used to determine that the subject vehicle is in the "scene of catching up with a preceding vehicle." Similarly, for all other travel scenes registered in the scene determination table, the travel scene determination function is used to determine whether or not each determination condition is satisfied.

Examples of the lane change prohibition condition include a condition that "the subject vehicle is traveling in a lane change prohibition area," a condition that "an obstacle exists in the direction of lane change," a condition that "the subject vehicle will get across a centerline (road center line)," and a condition that "the subject vehicle will enter a road shoulder or get across a road end." On a road on which emergency stop is permitted at a road shoulder or the like in an "emergency evacuation scene," the condition that "the subject vehicle will enter a road shoulder or get across a road end" may be permitted in the "emergency evacuation scene." In the table illustrated in FIG. 2, the necessity level of lane change, the time limit, and the direction of lane change will be described later.

When the travel scene of the subject vehicle corresponds to a plurality of travel scenes, the control device 190 can use the travel scene determination function to determine a travel scene having a higher necessity level of lane change as the travel scene of the subject vehicle. For example, it is assumed that, in the example illustrated in FIG. 2, the travel scene of the subject vehicle corresponds to a "scene of catching up with a preceding vehicle" and a "scene of lane transfer toward a destination." It is also assumed in this case that the necessity level X1 of lane change in the "scene of catching up with a preceding vehicle" is lower than the necessity level X8 of lane change in the "scene of lane transfer toward a destination" (X1<X8). In this case, the control device 190 can use the travel scene determination function to determine the "scene of lane transfer toward a destination" with the higher necessity level of lane change as the travel scene of the subject vehicle.

The control device 190 uses the travel control function to control travel of the subject vehicle. For example, the control device 190 uses the travel control function to detect lane marks of a lane in which the subject vehicle travels (also referred to as a "subject vehicle lane," hereinafter) on the basis of the detection results of the sensors 110 and perform lane keeping control to control a travel position of the subject vehicle in the road width direction. In this case, the control device 190 can use the travel control function to allow the drive control device 180 to control the operation of the steering actuator and the like so that the subject vehicle travels at an appropriate travel position. In addition or alternatively, the control device 190 can use the travel control function to perform the follow-up travel control to automatically follow a preceding vehicle with a certain distance from the preceding vehicle. In this case, the control device 190 can use the travel control function to allow the drive control device 180 to control the operation of the drive mechanism such as an engine and brake so that the subject vehicle travels with a constant distance between the subject vehicle and the preceding vehicle. In the following description, the automatic travel control will be described as including the lane keeping control and the follow-up travel control.

The control device 190 uses the lane change control function to determine whether or not to perform lane change on the basis of the travel scene of the subject vehicle and/or information on obstacles existing around the subject vehicle. When a determination is made to perform lane change, the control device 190 can use the lane change control function to allow the drive control device 180 to control the operation of the steering actuator. Details of a method of controlling lane change using the lane change control function will be described later.

A lane change control process according to the first embodiment will now be described with reference to FIG. 3 to FIG. 5. FIG. 3 to FIG. 5 are flowcharts illustrating the lane change control process according to the first embodiment. As will be understood, the lane change control process described below is executed by the control device 190. The description will be made below on the assumption that the control device 190 uses the travel control function to perform the follow-up travel control for the subject vehicle to follow a preceding vehicle.

First, in step S101, the control device 190 uses the travel information acquisition function to acquire the travel information regarding the travel state of the subject vehicle. In step S102, the control device 190 uses the travel scene determination function to determine the travel scene of the subject vehicle on the basis of the travel information acquired in step S101.

In step S103, the control device 190 uses the travel scene determination function to determine whether or not the travel scene of the subject vehicle determined in step S102 is a travel scene suitable for lane change. Specifically, when the travel scene of the subject vehicle is any of travel scenes illustrated in FIG. 2, the travel scene determination function is used to determine that the travel scene of the subject vehicle is a travel scene suitable for lane change. When the travel scene of the subject vehicle is not a travel scene suitable for lane change, the routine returns to step S101 from which the determination of the travel scene is repeated. When the travel scene of the subject vehicle is a travel scene suitable for lane change, the routine proceeds to step S104.

In step S104, the control device 190 uses the lane change control function to detect an object range. In the present embodiment, the control device 190 uses the lane change control function to detect obstacles existing around the subject vehicle on the basis of the external image information around the vehicle captured by the front camera and rear camera and/or the travel information including the detection results by the front radar, rear radar, and side radars. The control device 190 uses the lane change control function to detect a range that is located at a side of the subject vehicle and in which no obstacles exist, as the object range. The object range refers to a relative range with reference to the travel position when the subject vehicle travels at the current speed. When another vehicle existing around the subject vehicle travels straight ahead at the same speed as the subject vehicle, therefore, the object range does not vary. The "side of the subject vehicle" refers to a range in which the position at the side of the subject vehicle can be taken as a target position for lane change when the subject vehicle changes lanes (this target position is also a relative position with reference to the travel position when the subject vehicle travels at the current speed), and this range (such as direction, size, and angle) can be appropriately set. Methods of detecting an object range will be described below with reference to FIGS. 6A-6G. FIGS. 6A-6G are views for describing object ranges.

Figure 6A:
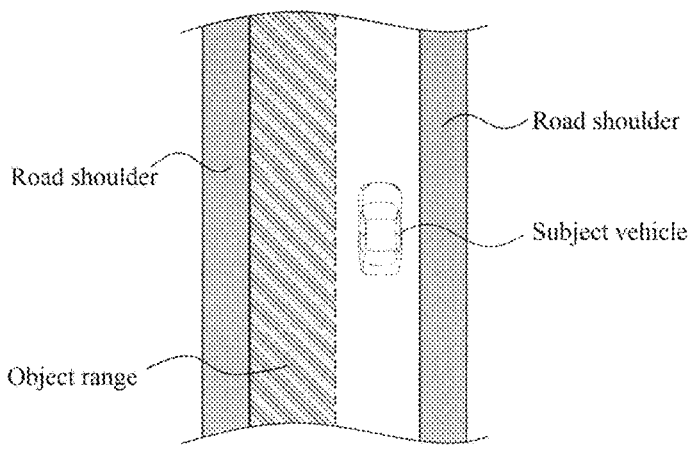
FIGS. 6A-6C are views (part 1) for describing methods of detecting an object range.

In the exemplary scene illustrated in FIG. 6A, no other vehicles as obstacles exist in an adjacent lane to the subject vehicle lane. The control device 190 can therefore use the lane change control function to detect the adjacent lane as an object range. As will be understood, road shoulders are excluded from the object range because the road shoulders are basically within ranges in which lane change cannot be performed. However, when the travel scene of the subject vehicle is an "emergency evacuation scene" on a road on which emergency stop or the like is permitted at a road shoulder, the road shoulder can be included in the object range (here and hereinafter).

Figure 6B:
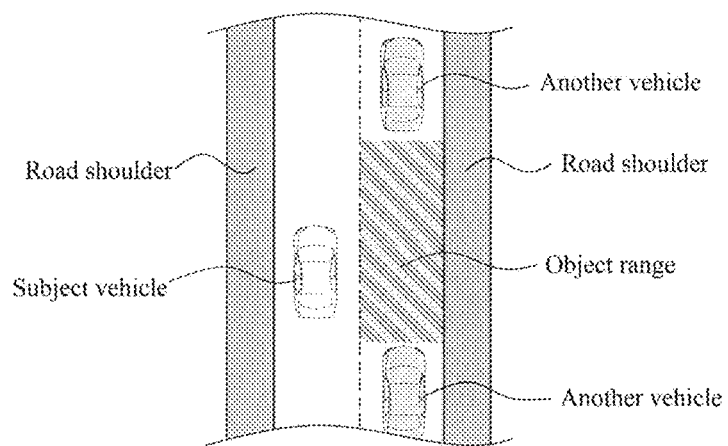

In the exemplary scene illustrated in FIG. 6B, other vehicles as obstacles exist in an adjacent lane to the subject vehicle lane. However, there is a range in which no other vehicles exist between the other vehicle located ahead of the subject vehicle and the other vehicle located behind the subject vehicle. The control device 190 can therefore use the lane change control function to detect that range as an object range. In the exemplary scene illustrated in FIG. 6C, the adjacent lane includes a range in which no other vehicles exist, as in the scene illustrated in FIG. 6B, and also in the next lane adjacent to the adjacent lane (also referred to as a "next adjacent lane," hereinafter), there is a range in which no other vehicles exist between the other vehicle located ahead and the other vehicle located behind. In this case, the control device 190 can use the lane change control function to detect the range in which no other vehicles exist in the adjacent lane and the range in which no other vehicles exist in the next adjacent lane as object ranges.

Figure 6C:
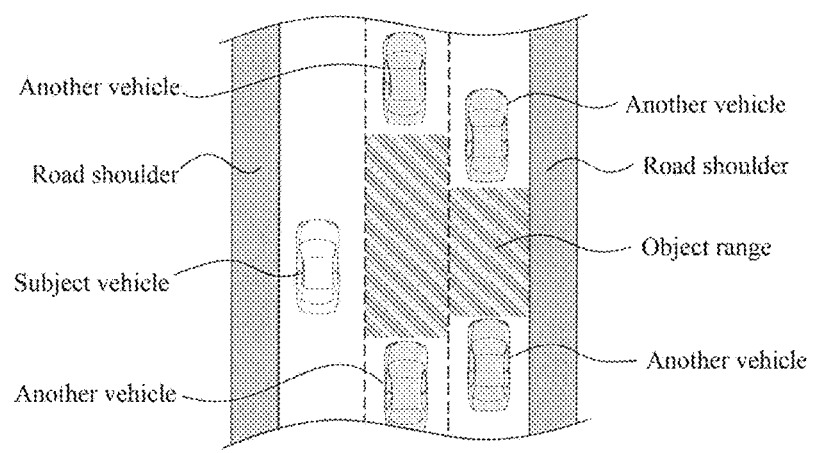
Figure 6D:
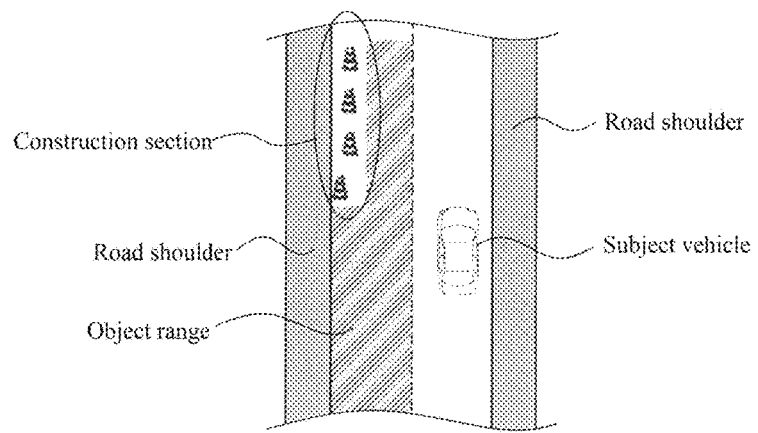
FIGS. 6D and 6E are views (part 2) for describing methods of detecting an object range.

In addition or alternatively, the control device 190 may use the lane change control function to detect an object range by excluding a range, such as a construction section as illustrated in FIG. 6D, in which the subject vehicle cannot travel, from the object range. Examples of such a range in which the subject vehicle cannot travel include a range in which another vehicle parks or stops and a range in which vehicles are prohibited from traveling due to traffic regulation, etc., in addition to a construction section. When, as illustrated in FIG. 6D, the range in which the subject vehicle cannot travel due to a construction section or the like occupies half or more of the adjacent lane (half or more in the road width direction), for example, the remaining less than half of the range may not be detected as an object range.

Figure 6E:
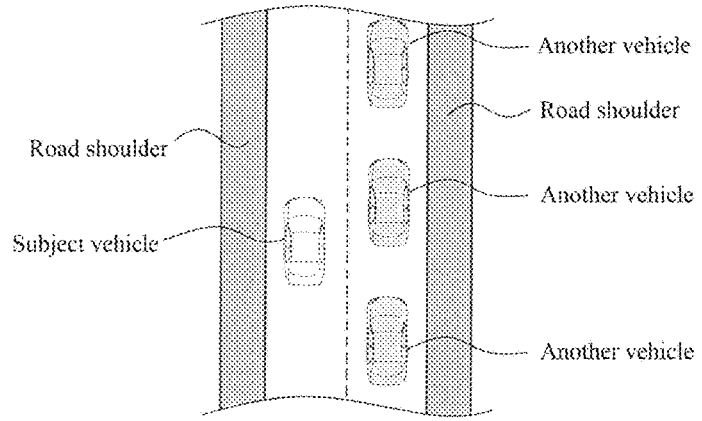

When, as illustrated in FIG. 6E, other vehicles are traveling in series in the adjacent lane and no space for lane change exists in the adjacent lane, the control device 190 can use the lane change control function to determine that an object range cannot be detected.

Figure 6F:
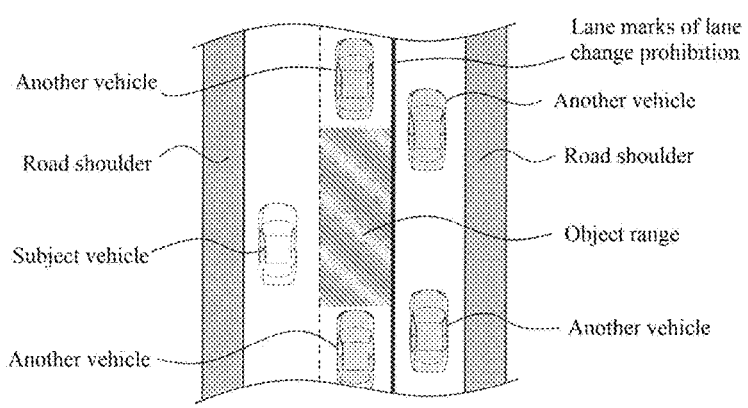
FIGS. 6F and 6G are views (part 3) for describing methods of detecting an object range.
Figure 6G:
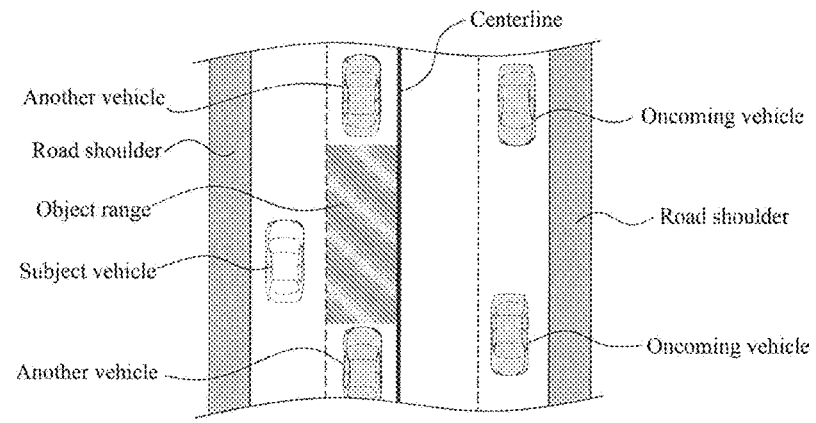

The exemplary scene illustrated in FIG. 6F is a scene in which the subject vehicle is traveling on a road on which lane change from the adjacent lane to the next adjacent lane is prohibited. On such a road, the control device 190 uses the lane change control function to detect a range in which no obstacles exist in the adjacent lane to which lane change is possible, as an object range. That is, in this case, the next adjacent lane to which lane change cannot be performed is not detected as an object range. The exemplary scene illustrated in FIG. 6G is a scene in which the subject vehicle is traveling on a road having oncoming lanes. On such a road, the control device 190 uses the lane change control function to detect an object range only in a lane in the same direction as the travel direction of the subject vehicle. That is, in this case, an object range is not detected in the oncoming lanes.

In the present embodiment, the control device 190 uses the lane change control function to detect an object range in a direction, among right and left directions, which is suitable for lane change in the travel scene of the subject vehicle. In the present embodiment, the direction suitable for lane change in each travel scene is preliminarily stored in the table illustrated in FIG. 2. The control device 190 uses the lane change control function to refer to the table illustrated in FIG. 2 to acquire information on the "direction of lane change" in the travel scene of the subject vehicle. For example, when the travel scene of the subject vehicle is a "scene of catching up with a preceding vehicle," the control device 190 uses the lane change control function to refer to the table of FIG. 2 to acquire a "direction toward the overtaking lane side" as the "direction of lane change." Then, the control device 190 uses the lane change control function to detect an object range in the "direction of lane change." For example, when the travel scene of the subject vehicle is a "scene of catching up with a preceding vehicle," the control device 190 uses the lane change control function to detect an object range in the "direction toward the overtaking lane side," that is, in the direction toward a lane in which travel of an overtaking vehicle is recommended (e.g. the rightward direction in the examples illustrated in FIG. 6A to FIG. 6D. Thus, the lane change control function can be used to detect an object range in the direction of lane change suitable for the travel scene of the subject vehicle.

In addition or alternatively, the control device 190 may use the lane change control function to detect an object range at a side of the subject vehicle. For example, even when a range is detected in which no obstacles exist in the adjacent lane, if the range is separate from the current position of the subject vehicle by a certain distance or more and located behind or ahead of the subject vehicle, it may be difficult to perform lane change to such a range, which is therefore not detected as an object range.

Figure 7:
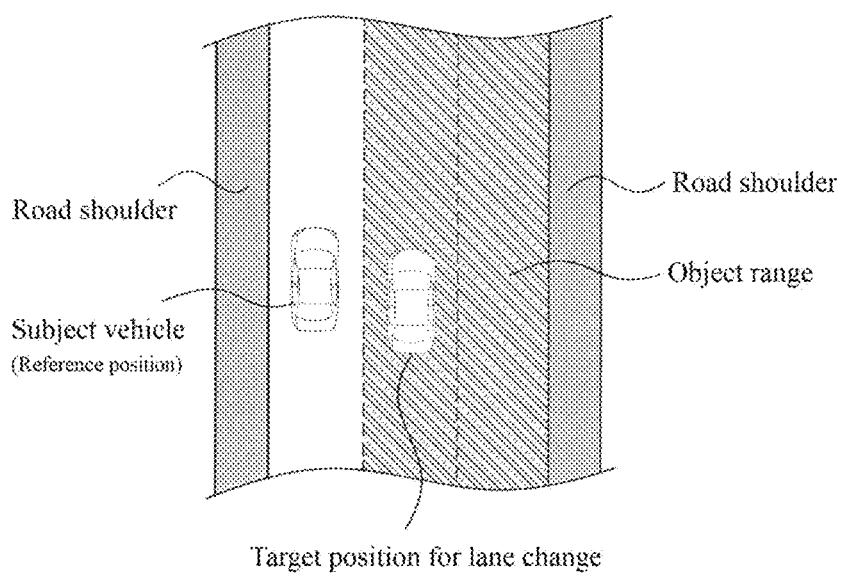
FIG. 7 is a view for describing a method of setting a target position for lane change.

In step S105, the control device 190 uses the lane change control function to set a target position for lane change. For example, as illustrated in FIG. 7, the control device 190 can use the lane change control function to set a position that is within the object range in the adjacent lane detected in step S104 and that is shifted backward from the position of the subject vehicle by a small distance, as the target position for lane change (e.g. position of the vehicle indicated by the dashed line in FIG. 7). The target position for lane change is a relative position with respect to the position at which the subject vehicle travels. That is, provided that the position when the subject vehicle travels at the current speed without changing the speed is a reference position, a position located laterally behind the reference position by a small distance can be set as the target position for lane change. This allows the subject vehicle to change lanes to the adjacent lane without accelerating the subject vehicle when the subject vehicle moves to the target position for lane change. FIG. 7 is a view for describing a method of setting the target position for lane change.

The control device 190 can use the lane change control function to set the target position for lane change by taking into account the ease of lane change, such as a situation that the object range in the adjacent lane includes a range to which the subject vehicle can move and a situation that another vehicle that may enter the object range does not exist around the subject vehicle. For example, when another vehicle existing around the object range lights the winkers toward the object range and/or travels while deviating toward the object range side, the lane change control function can be used to determine that the other vehicle may enter the object range. In this case, another position in an object range which the other vehicle is less likely to enter can be set as the target position. In the above exemplary case, the target position for lane change is set at a position located behind the subject vehicle within the object range in the adjacent lane. In an alternative embodiment, the target position for lane change may be set at a position located ahead of the subject vehicle within the object range in the adjacent lane. In an alternative embodiment, step S105 may include setting a target route for changing lanes instead of setting the target position for lane change.

In step S106, the control device 190 uses the lane change control function to estimate a required time T1 for lane change. For example, the control device 190 can use the lane change control function to estimate a time required for the subject vehicle to move from the current position to the target position for lane change as the required time T1 on the basis of the vehicle speed and/or acceleration of the subject vehicle.

In step S107, the control device 190 uses the lane change control function to estimate an object range after the predetermined time T1 estimated in step S106. Specifically, the control device 190 uses the lane change control function to estimate the travel position after the predetermined time T1 of another vehicle existing around the subject vehicle on the basis of the vehicle speed and acceleration of the other vehicle. For example, the control device 190 uses the lane change control function to repeatedly detect the positional information of the other vehicle thereby to measure the speed vector v0, acceleration vector a0, and positional vector p0 of the other vehicle, as illustrated in FIG. 8A.

Figure 8A:
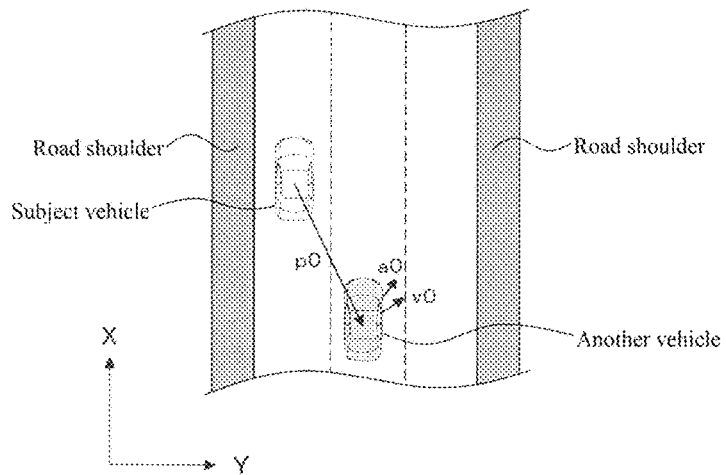
FIGS. 8A and 8B are views for describing a method of estimating the position of another vehicle after a predetermined time.

As illustrated in FIG. 8A, when the travel direction of the subject vehicle is along X-axis and the road width direction is along Y-axis, the speed vector v0 of the other vehicle is represented by the following equation (1):

$$v0 = vx0i + vy0j \quad (1)$$

where vx0 represents a speed component in the X-axis direction of the speed vector of the other vehicle and vy0 represents a speed component in the Y-axis direction of the speed vector of the other vehicle. In the above equation (1), i represents a unit vector in the X-axis direction and j represents a unit vector in the Y-axis direction (the same applies to the following equations (2), (3), and (6)).

The acceleration vector a0 of the other vehicle can be obtained as represented by the following equation (2) while the positional vector p0 of the other vehicle can be obtained as represented by the following equation (3).

$$a0 = ax0i + ay0j \quad (2)$$

$$p0 = px0i + py0j \quad (3)$$

In the above equation (2), ax0 represents an acceleration component in the X-axis direction of the acceleration vector of the other vehicle and ay0 represents an acceleration component in the Y-axis direction of the acceleration vector of the other vehicle. In the above equation (3), px0 represents a positional component in the X-axis direction of the positional vector of the other vehicle and py0 represents a positional component in the Y-axis direction of the positional vector of the other vehicle.

Figure 8B:
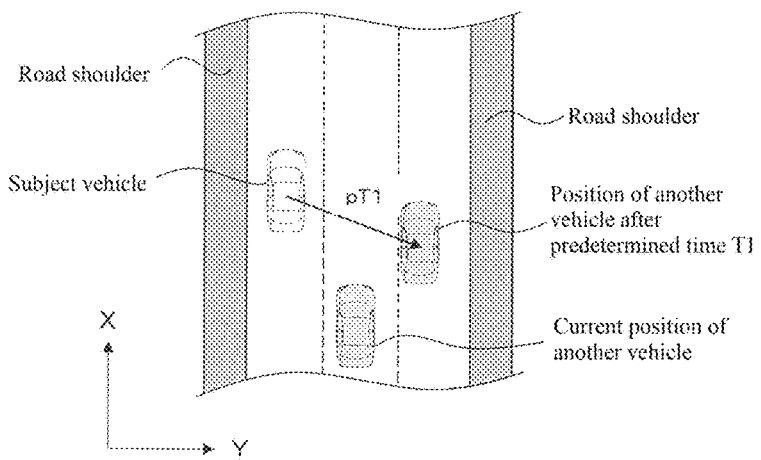

Then, the control device 190 uses the lane change control function to calculate a positional vector pT1 after the predetermined time T1 of the other vehicle, as illustrated in FIG. 8B. Specifically, the control device 190 uses the lane change control function to calculate the positional vector pT1 after the predetermined time T1 of the other vehicle on the basis of the following equations (4) to (6).

$$pxT1 = px0 + vx0T1 + \tfrac{1}{2}(ax0T1)^2 \quad (4)$$

$$pyT1 = py0 + vy0T1 + \tfrac{1}{2}(ay0T1)^2 \quad (5)$$

$$pT1 = pxT1i + pyT1j \quad (6)$$

In the above equations (4) and (5), pxT1 represents a positional component in the X-axis direction of the positional vector pT1 after the predetermined time T1 of the other vehicle, pyT1 represents a positional component in the Y-axis direction of the positional vector pT1 after the predetermined time T1 of the other vehicle, vx0T1 represents a moving speed in the X-axis direction of the other vehicle after the predetermined time T1, vy0T1 represents a moving speed in the Y-axis direction of the other vehicle after the predetermined time T1, ax0T1 represents acceleration in the X-axis direction of the other vehicle after the predetermined time T1, and ay0T1 represents acceleration in the Y-axis direction of the other vehicle after the predetermined time T1.

The control device 190 uses the lane change control function to estimate positions after the predetermined time T1 of all other vehicles existing around the subject vehicle. Then, the control device 190 uses the lane change control function to estimate an object range after the predetermined time T1 on the basis of the positions after the predetermined time T1 of the other vehicles. The control device 190 can use the lane change control function to estimate the object range after the predetermined time T1 by taking into account the situation of lane regulation after the predetermined time T1, existence of obstacles on the road, presence or absence of obstruction in the adjacent lane, and existence of a section, such as a construction section, to which the subject vehicle cannot move. The control device 190 can use the lane change control function to estimate an object range after the predetermined time T1 as in step S104.

Figure 9A:
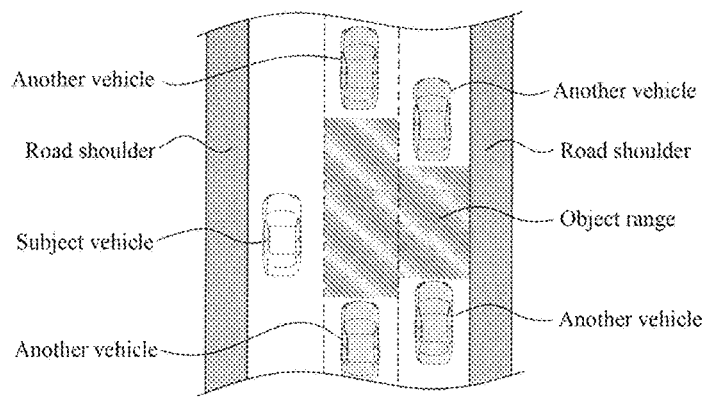
FIGS. 9A-9C are views for describing a method of determining whether or not an object range becomes small.
Figure 9B:
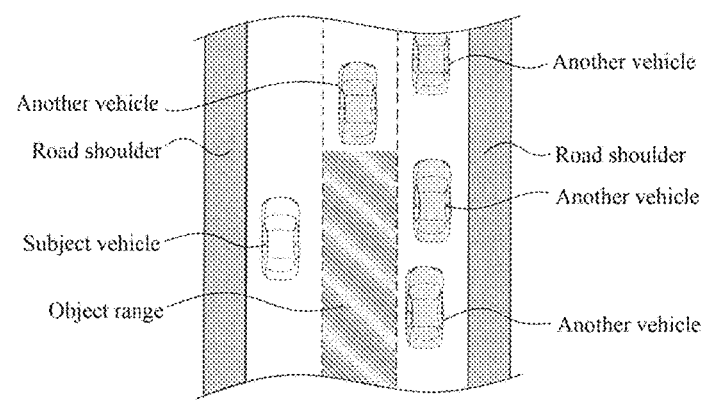
Figure 9C:
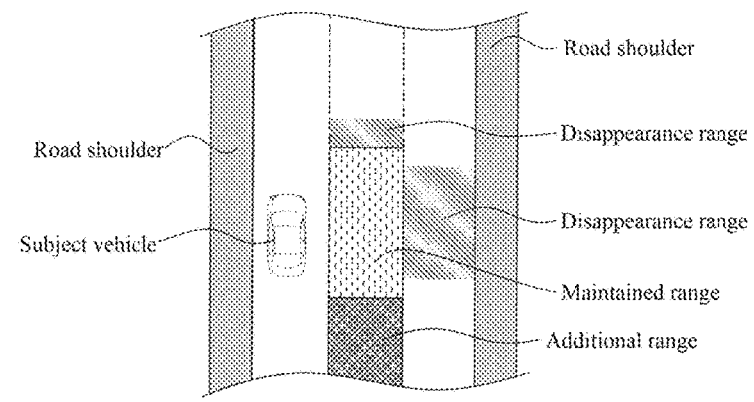

In step S108, the control device 190 uses the lane change control function to estimate whether or not the object range becomes small in the adjacent lane after the predetermined time T1 on the basis of the current object range detected in step S104 and the object range after the predetermined time T1 estimated in step S107. FIGS. 9A-9C are views for describing a method of determining whether or not the object range becomes small.

In the example illustrated in FIGS. 9A-9C, it is assumed, for example, that the current object range is an object range illustrated in FIG. 9A while the object range after the predetermined time T1 is an object range illustrated in FIG. 9B. In this case, the control device 190 uses the lane change control function to compare the current object range of FIG. 9A and the object range after the predetermined time T1 of FIG. 9B to determine whether or not the object range in the adjacent lane becomes small after the predetermined time T1. Specifically, the control device 190 uses the lane change control function to overlap the current object range of FIG. 9A and the object range after the predetermined time T1 of FIG. 9B and estimate that the object range becomes small in the adjacent lane when the size of the current object range in the adjacent lane is larger than the size of the object range after the predetermined time T1 in the adjacent lane. Then, when it is estimated that the object range in the adjacent lane becomes small after the predetermined time T1, the routine proceeds to step S109 in which announcement information is announced that the object range will become small after the predetermined time T1. For example, the control device 190 can use the lane change control function to announce an alarm that the object range will become small after the predetermined time T1, using the display and/or speaker of the announcement device 150.

In step S108, the control device 190 also uses the lane change control function to compare the current object range of FIG. 9A and the object range after the predetermined time T1 of FIG. 9B to specify disappearance ranges. The disappearance ranges refer to ranges that will disappear from the object range after the predetermined time T1 as illustrated in FIG. 9C, that is, ranges that are included in the current object range of FIG. 9A but will not be included in the object range after the predetermined time T1 of FIG. 9B. In addition, the control device 190 uses the lane change control function to compare the current object range of FIG. 9A and the object range after the predetermined time T1 of FIG. 9B to specify an additional range. The additional range refers to a range that will be added to the object range after the predetermined time T1 as illustrated in FIG. 9C, that is, a range that is not included in the current object range of FIG. 9A but will be included in the object range after the predetermined time T1 of FIG. 9B.

Figure 10:
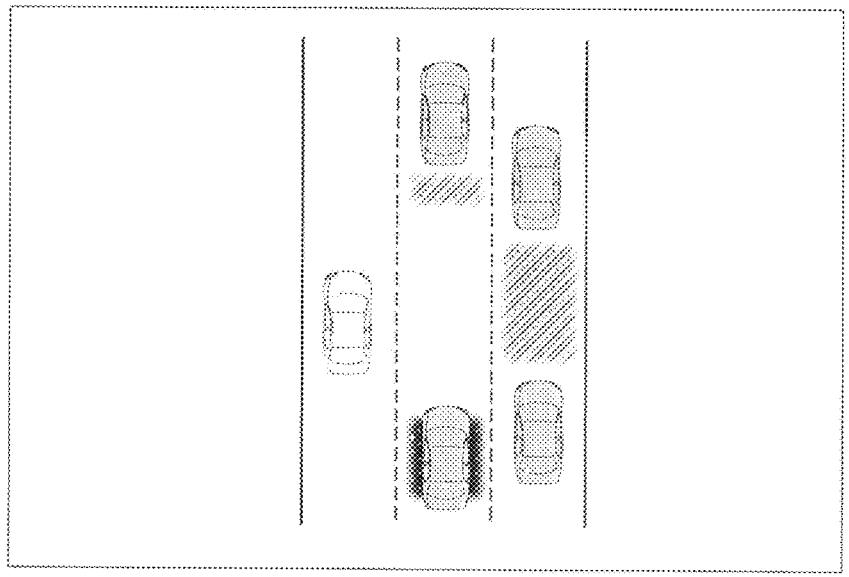
FIG. 10 illustrates an example of a screen displayed on the display of an announcement device.

Then, when a disappearance range or an additional range is specified, the control device 190 can use the lane change control function in step S109 to announce the announcement information, which includes information on the disappearance range or additional range, to the driver. For example, in the scene illustrated in FIG. 9C, the control device 190 can use the lane change control function to display the disappearance ranges and the additional range on the display of the announcement device 150 in different display forms, as illustrated in FIG. 10. This allows the driver to appropriately perceive the disappearance ranges and the additional range. FIG. 10 is a view illustrating an example of the announcement information displayed on the display of the announcement device 150.

The control device 190 can use the lane change control function to announce the announcement information that the object range will become small only when the size of the object range is to become small after the predetermined time T1 to a predetermined range or more. In addition or alternatively, the control device 190 can use the lane change control function to announce the disappearance range and/or the additional range when the size of the disappearance range and/or additional range is not smaller than a predetermined size. In addition or alternatively, the control device 190 can use the lane change control function to change the display form of the disappearance range or the display form of the object range after the predetermined time T1 in accordance with the size of the disappearance range. For example, the control device 190 can use the lane change control function to change the display form of the disappearance range or the display form of the object range after the predetermined time T1 between a case in which the size of the disappearance range is a predetermined range or more and a case in which the size of the disappearance range is less than the predetermined range. In an example, the control device 190 can use the lane change control function to display the disappearance range or the object range after the predetermined time T1 in green color or the like when the size of the disappearance range is less than a predetermined range and display the disappearance range or the object range after the predetermined time T1 in red color or the like in an emphasized manner when the size of the disappearance range is the predetermined range or more. In addition or alternatively, the control device 190 can use the lane change control function to display the disappearance range or the object range after the predetermined time T1 in a blinking manner when the size of the disappearance range is a predetermined range or more. In addition or alternatively, when the size of the disappearance range is a predetermined range or more, an alarm lamp provided in an indicator may be configured to light. In addition or alternatively, provided that the announcement device 150 includes a speaker, the speaker may be configured to output sound of a tone and/or volume level that get attention of the driver when the size of the disappearance range is a predetermined range or more, as compared with when the size of the disappearance range is less than the predetermined range. In addition or alternatively, the control device 190 can use the lane change control function to change the display form of the disappearance range in accordance with the rate with which the object range becomes small. For example, when the rate with which the object range becomes small is a predetermined rate or more, the control device 190 can use the lane change control function to display the disappearance range or the object range after the predetermined time T1 in an emphasized manner, such as in red color and in a blinking manner.

In step S110, the control device 190 uses the lane change control function to acquire information on a required range. The required range refers to a range having a size necessary for the subject vehicle to change lanes, or a range having a size that is at least equal to or larger than a size which the subject vehicle occupies on a road surface. Although details will be described later, in the present embodiment, when a required range is set at the target position for lane change and the object range in the adjacent lane includes the required range, a determination is made that a space corresponding to the required range exists within the object range in the adjacent lane, and lane change is permitted. In the present embodiment, the memory of the control device 190 stores information including the shape and size of the required range, and the lane change control function can be used to acquire the information on the required range from the memory of the control device 190.

In step S111, the control device 190 uses the lane change control function to correct the required range acquired in step S110. The lane change control function can be used to correct the required range on the basis of any one of conditions described below or on the basis of a combination of two or more of these conditions.

Figure 11A:
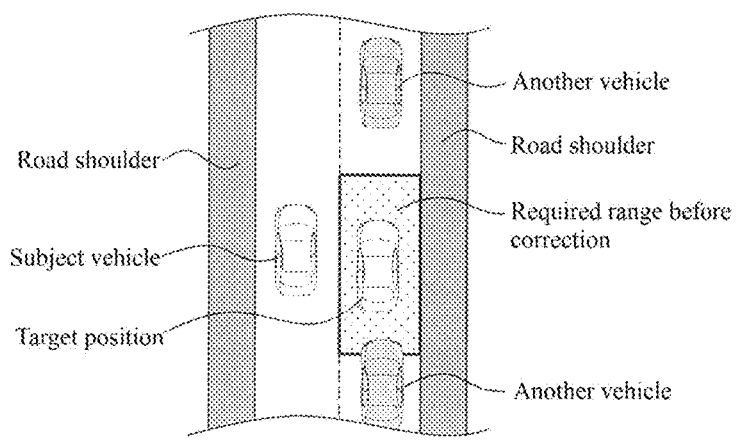
FIGS. 11A and 11B are views for describing a method of correcting a required range based on a necessity level of lane change.
Figure 11B:
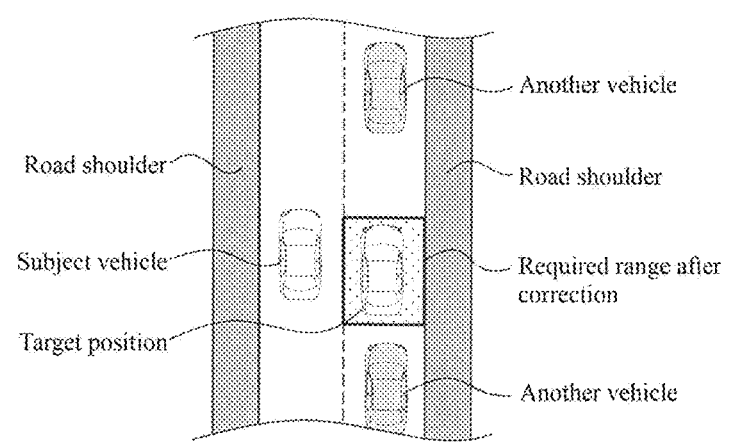

First, the control device 190 can use the lane change control function to correct the required range in accordance with a necessity level of lane change in the travel scene of the subject vehicle. In the present embodiment, the table illustrated in FIG. 2 preliminarily stores the necessity level of lane change in each travel scene. The control device 190 uses the lane change control function to refer to the table illustrated in FIG. 2 to acquire the necessity level of lane change in the travel scene of the subject vehicle. For example, in the "scene of catching up with a preceding vehicle," the control device 190 can use the lane change control function to refer to the table illustrated in FIG. 2 to acquire "X1" as the necessity level of lane change. Then, when the necessity level X1 of lane change is high (when the necessity level of lane change is a predetermined value or higher), the control device 190 can use the lane change control function to reduce the length of the required range in the travel direction of the subject vehicle as compared with the case of a low necessity level of lane change (the case in which the necessity level of lane change is less than the predetermined value), thereby reducing the required range in the travel direction of the subject vehicle. For example, in the example illustrated in FIGS. 11A and 11B, provided that FIG. 11A represents the required range before correction, when the necessity level X1 of lane change is high (when the necessity level of lane change is a predetermined value st1 or higher), the control device 190 can use the lane change control function to reduce the required range in the travel direction of the subject vehicle as illustrated in FIG. 11B. As will be understood, the control device 190 uses the lane change control function to correct the required range within a range that is not smaller than the range which the subject vehicle occupies the road surface. In addition or alternatively, the control device 190 can use the lane change control function to reduce the required range as the necessity level of lane change in the travel scene of the subject vehicle increases. In addition or alternatively, although not illustrated, when the necessity level X1 of lane change is low (when the necessity level of lane change is lower than a predetermined value st2 (st1>st2)), the control device 190 can use the lane change control function to increase the required range in the travel direction of the subject vehicle as compared with the required range before correction.

Figure 12A:
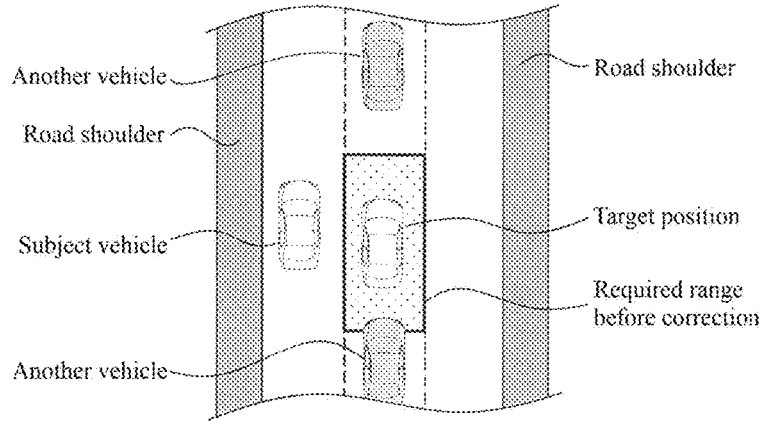
FIGS. 12A and 12B are views for describing a method of correcting a required range based on a situation of a next adjacent lane.
Figure 12B:
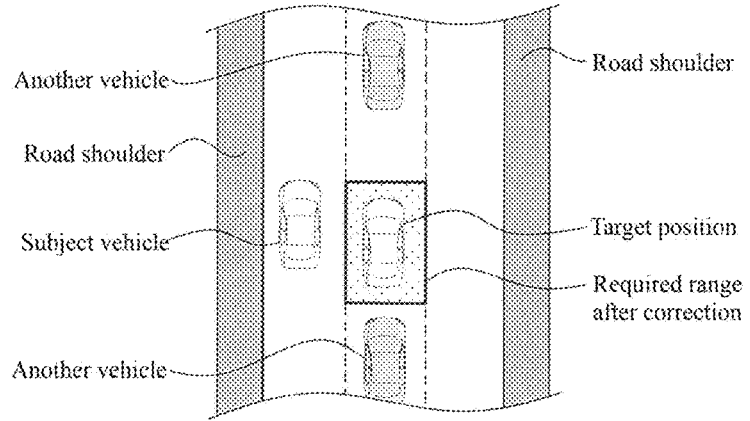

Second, the control device 190 can use the lane change control function to detect an object range with no other vehicles in the next lane adjacent to the adjacent lane (next adjacent lane) and correct the required range on the basis of the detected object range in the next adjacent lane. For example, when a space (e.g. a space corresponding to the required range) to which another vehicle traveling in the adjacent lane (also referred to as an "adjacent vehicle," hereinafter) can change lanes is detected in the object range in the next adjacent lane, that is, when a space to which the adjacent vehicle can change lanes can be detected in the next adjacent lane, the control device 190 can use the lane change control function to reduce the required range. Specifically, when a space to which the adjacent vehicle can change lanes can be detected in the next adjacent lane, the control device 190 uses the lane change control function to reduce the length of the required range in the travel direction of the subject vehicle, thereby reducing the required range in the travel direction of the subject vehicle. For example, in the example illustrated in FIGS. 12A and 12B, provided that FIG. 12A represents the required range before correction, when a space to which the adjacent vehicle can change lanes can be detected in the next adjacent lane, the control device 190 can use the lane change control function to reduce the length of the required range in the travel direction of the subject vehicle as illustrated in FIG. 12B, thereby reducing the required range in the travel direction of the subject vehicle. In addition or alternatively, the control device 190 can use the lane change control function to reduce the required range in the travel direction of the subject vehicle as the space to which the adjacent vehicle can change lanes increases in the next adjacent lane.

Figure 13A:
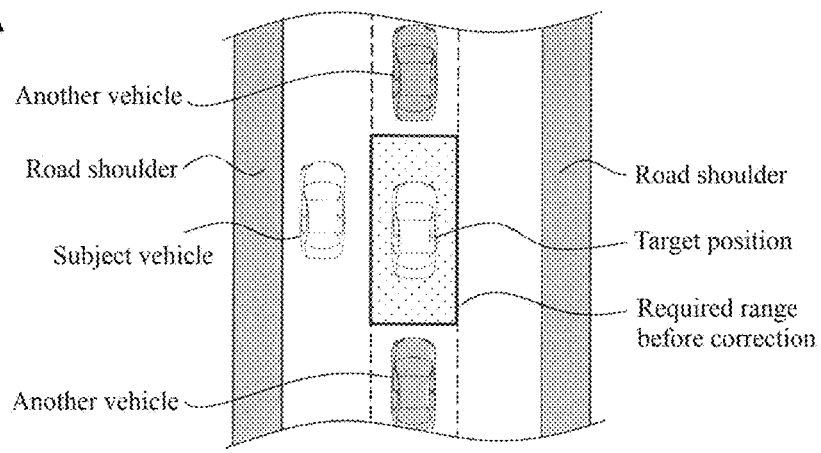
FIGS. 13A-13C are views for describing methods of correcting a required range based on a travel position of an adjacent vehicle in the road width direction.
Figure 13B:
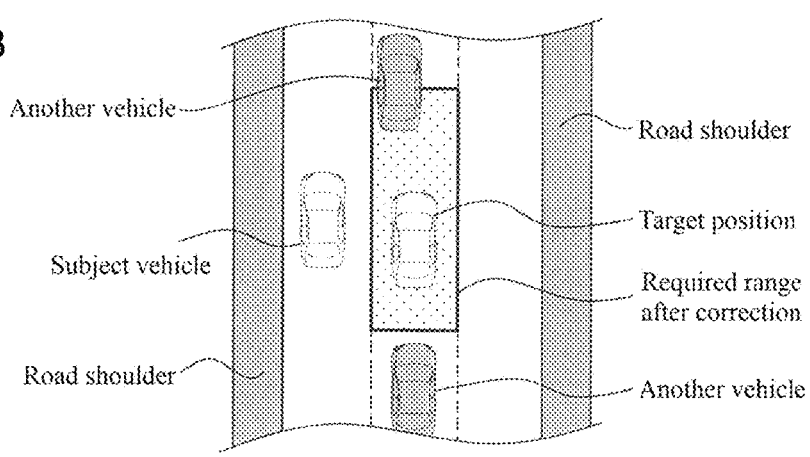
Figure 13C:
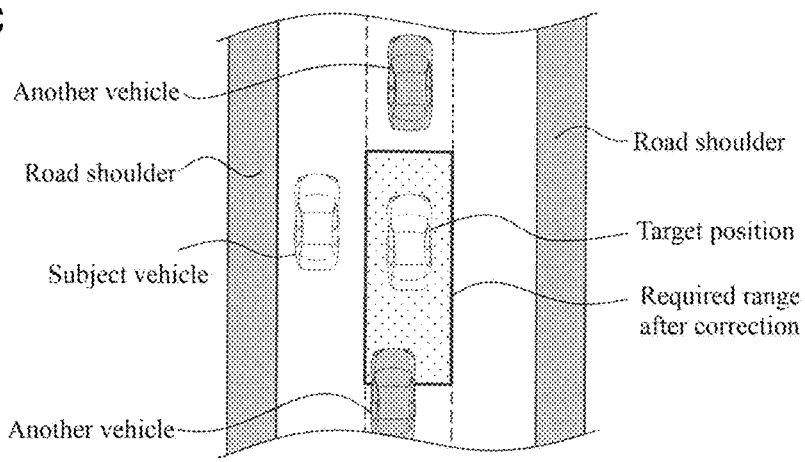

Third, the control device 190 can use the lane change control function to correct the required range on the basis of the travel position in the road width direction of another vehicle traveling in the adjacent lane (adjacent vehicle). Specifically, the control device 190 uses the lane change control function to detect the travel position of the adjacent vehicle in the road width direction. When the travel position of the adjacent vehicle in the road width direction is nearer to the subject vehicle lane side than the center of the adjacent lane, the control device 190 uses the lane change control function to increase the length of the required range in the travel direction of the subject vehicle thereby to increase the required range. More specifically, the control device 190 uses the lane change control function to increase the length of the required range in the frontward direction with respect to the subject vehicle when the adjacent vehicle travels ahead of the subject vehicle and increase the length of the required range in the rearward direction with respect to the subject vehicle when the adjacent vehicle travels behind the subject vehicle. For example, in the example illustrated in FIGS. 13A-13C, provided that FIG. 13A represents the required range before correction, the control device 190 can use the lane change control function to increase the required range frontward when the adjacent vehicle travels ahead of the subject vehicle and nearer to the subject vehicle lane side than the center of the adjacent lane as illustrated in FIG. 13B and increase the required range rearward when the adjacent vehicle travels behind the subject vehicle and nearer to the subject vehicle lane side than the center of the adjacent lane as illustrated in FIG. 13C. In addition or alternatively, the control device 190 can use the lane change control function to increase the required range in the travel direction of the subject vehicle as the adjacent vehicle is nearer to the subject vehicle lane side (as the distance in the road width direction from lane marks at the subject vehicle lane side of the adjacent lane to the adjacent vehicle is shorter).

Figure 13D:
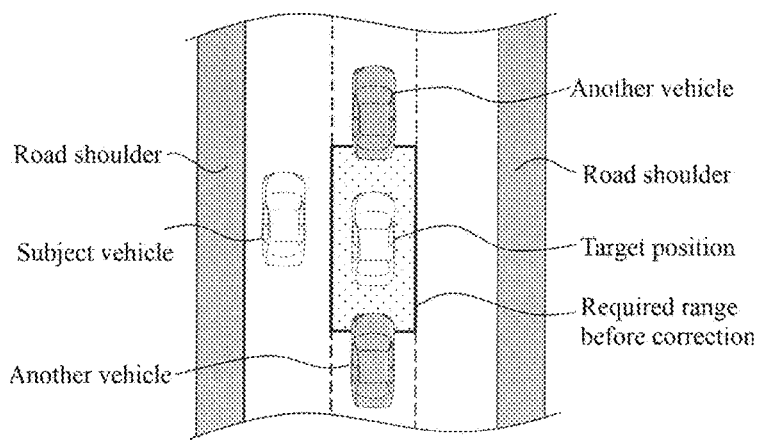
FIGS. 13D-13F are views for describing methods of correcting a required range based on a travel position of an adjacent vehicle in the road width direction.
Figure 13E:
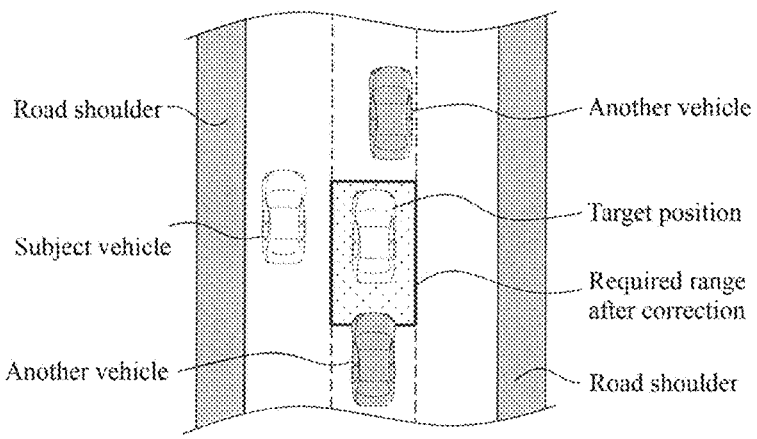
Figure 13F:
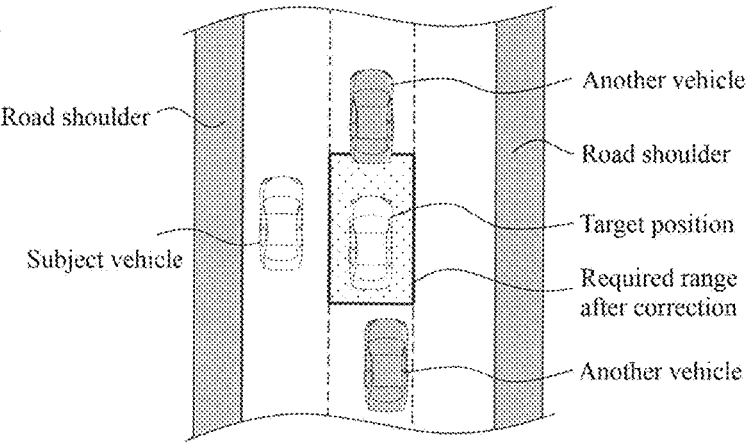

In addition or alternatively, when the travel position of the adjacent vehicle in the road width direction is nearer to the opposite side to the subject vehicle lane than the center of the adjacent lane, the control device 190 uses the lane change control function to reduce the length of the required range in the travel direction of the subject vehicle thereby to reduce the required range. More specifically, the control device 190 uses the lane change control function to reduce the required range from ahead when the adjacent vehicle travels ahead of the subject vehicle and reduce the required range from behind when the adjacent vehicle travels behind the subject vehicle. For example, in the example illustrated in FIGS. 13D-13F, provided that FIG. 13D represents the required range before correction, the control device 190 can use the lane change control function to reduce the required range from ahead when the adjacent vehicle travels ahead of the subject vehicle and nearer to the opposite side to the subject vehicle lane than the center of the adjacent lane as illustrated in FIG. 13E and reduce the required range from behind when the adjacent vehicle travels behind the subject vehicle and nearer to the opposite side to the subject vehicle lane than the center of the adjacent lane as illustrated in FIG. 13F. In addition or alternatively, the control device 190 can use the lane change control function to reduce the required range in the travel direction of the subject vehicle as the adjacent vehicle is nearer to the opposite side to the subject vehicle lane (as the distance in the road width direction from lane marks at the subject vehicle lane side of the adjacent lane to the adjacent vehicle is longer).

Figure 14A:
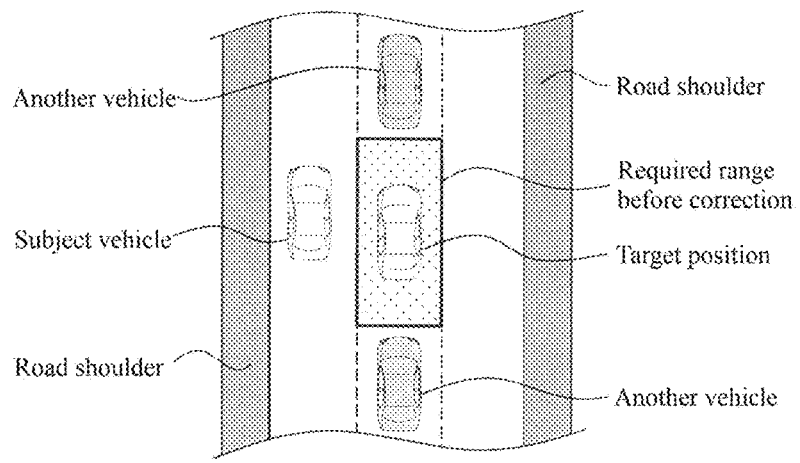
FIGS. 14A-14C are views for describing methods of correcting a required range based on a lighting state of winkers of an adjacent vehicle.
Figure 14B:
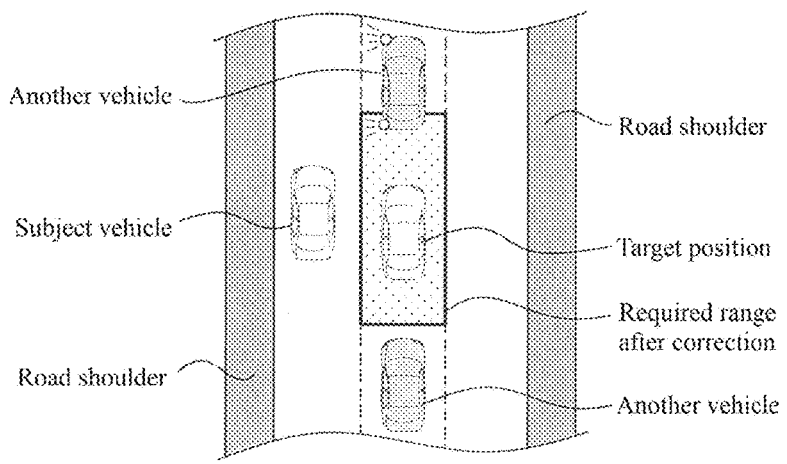
Figure 14C:
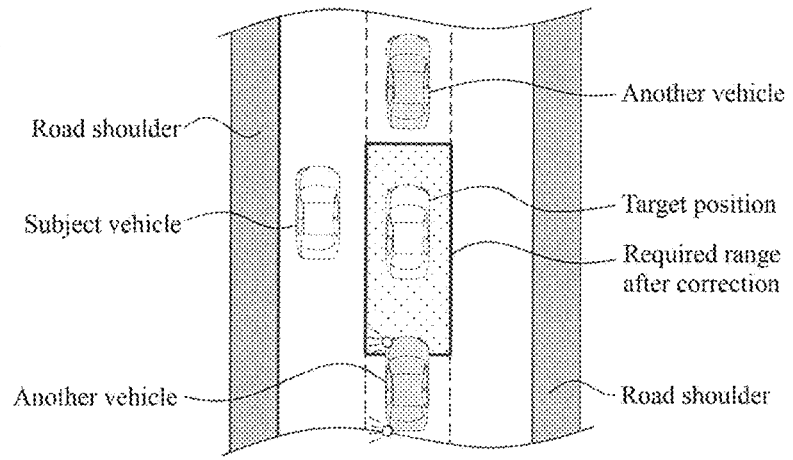

Fourth, the control device 190 can use the lane change control function to correct the required range on the basis of a lighting state of winkers of another vehicle traveling in the adjacent lane (adjacent vehicle). Specifically, the control device 190 uses the lane change control function to detect the lighting state of winkers of the adjacent vehicle. When the adjacent vehicle lights the winkers at the subject vehicle lane side, the control device 190 uses the lane change control function to increase the length of the required range in the travel direction of the subject vehicle thereby to increase the required range. More specifically, the control device 190 uses the lane change control function to increase the length of the required range in the frontward direction with respect to the subject vehicle when the adjacent vehicle traveling ahead of the subject vehicle lights the winkers at the subject vehicle lane side and increase the length of the required range in the rearward direction with respect to the subject vehicle when the adjacent vehicle traveling behind the subject vehicle lights the winkers at the subject vehicle lane side. For example, in the example illustrated in FIGS. 14A-14C, provided that FIG. 14A represents the required range before correction, the control device 190 can use the lane change control function to increase the required range frontward when the adjacent vehicle travels ahead of the subject vehicle while lighting the winkers at the subject vehicle lane side. When the adjacent vehicle travels behind the subject vehicle while lighting the winkers at the subject vehicle lane side as illustrated in FIG. 14C, the control device 190 can use the lane change control function to increase the required range rearward.

Figure 14D:
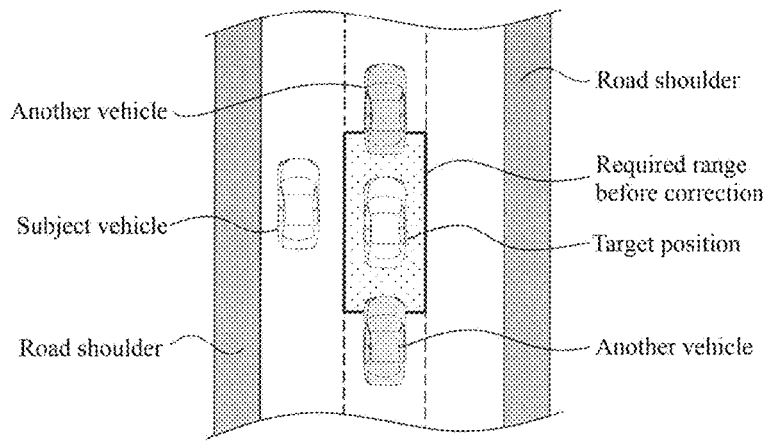
FIGS. 14D-14F are views for describing methods of correcting a required range based on a lighting state of winkers of an adjacent vehicle.
Figure 14E:
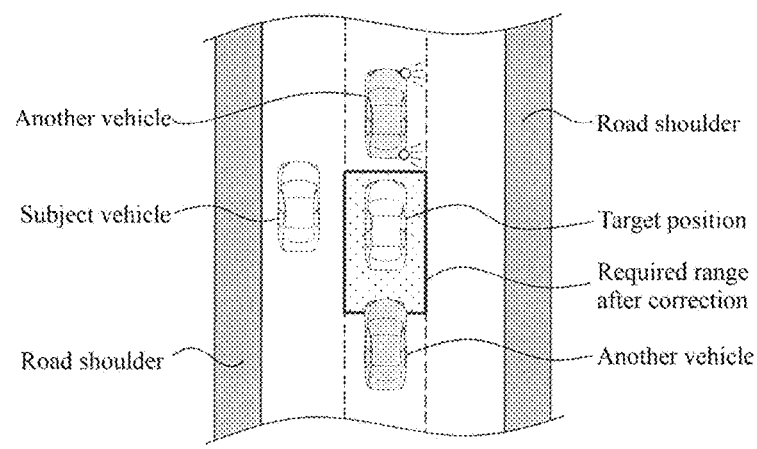
Figure 14F:
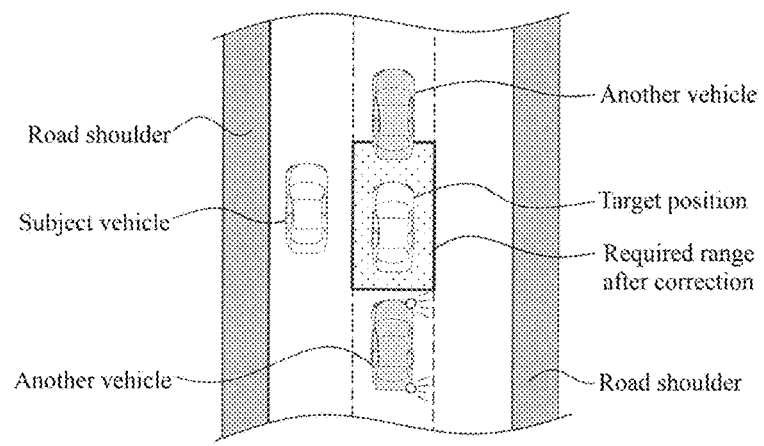

In addition or alternatively, when the adjacent vehicle lights the winkers at the opposite side to the subject vehicle lane, the control device 190 uses the lane change control function to reduce the length of the required range in the travel direction of the subject vehicle thereby to reduce the required range. More specifically, the control device 190 uses the lane change control function to reduce the required range from ahead when the adjacent vehicle traveling ahead of the subject vehicle lights the winkers at the opposite side to the subject vehicle lane and reduce the required range from behind when the adjacent vehicle traveling behind the subject vehicle lights the winkers at the opposite side to the subject vehicle lane. For example, in the example illustrated in FIGS. 14D-14F, provided that FIG. 14D represents the required range before correction, the control device 190 can use the lane change control function to reduce the required range from ahead when the adjacent vehicle travels ahead of the subject vehicle while lighting the winkers at the opposite side to the subject vehicle lane. When the adjacent vehicle travels behind the subject vehicle while lighting the winkers at the opposite side to the subject vehicle lane as illustrated in FIG. 14F, the control device 190 can use the lane change control function to reduce the required range from behind.

Fifth, the control device 190 can use the lane change control function to correct the required range on the basis of the speed and/or acceleration of another vehicle traveling in the adjacent lane (adjacent vehicle). Specifically, the control device 190 uses the lane change control function to detect the speed and acceleration of the adjacent vehicle and estimate whether or not the adjacent vehicle comes away from the subject vehicle from the speed and acceleration of the adjacent vehicle, for example, as illustrated in FIGS. 8A and 8B. Then, when the adjacent vehicle is estimated to come away from the subject vehicle, the control device 190 uses the lane change control function to reduce the length of the required range in the travel direction of the subject vehicle thereby to reduce the required range in the travel direction of the subject vehicle. More specifically, the control device 190 uses the lane change control function to reduce the required range from ahead when the adjacent vehicle traveling ahead of the subject vehicle comes away from the subject vehicle and reduce the required range from behind when the adjacent vehicle traveling behind the subject vehicle comes away from the subject vehicle.

In addition or alternatively, when the adjacent vehicle is estimated to come close to the subject vehicle, the control device 190 uses the lane change control function to increase the length of the required range in the travel direction of the subject vehicle thereby to increase the required range in the travel direction of the subject vehicle. More specifically, the control device 190 uses the lane change control function to increase the required range frontward when the adjacent vehicle traveling ahead of the subject vehicle comes close to the subject vehicle and increase the required range rearward when the adjacent vehicle traveling behind the subject vehicle comes close to the subject vehicle.

In an alternative embodiment, step S111 may include correcting the object range in the adjacent lane instead of correcting the required range.

Figure 15A:
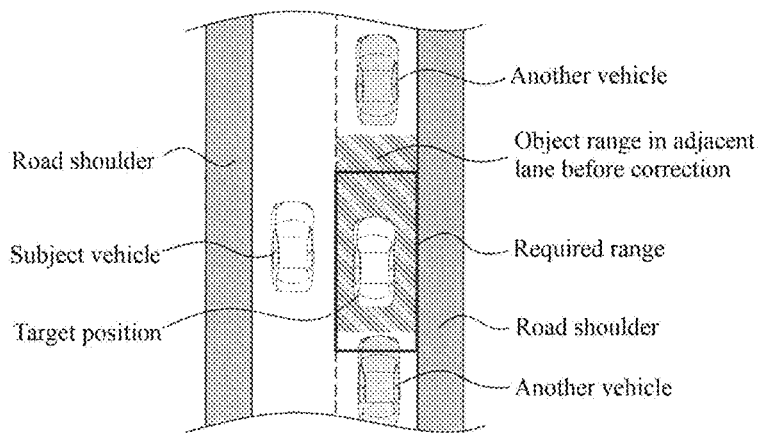
FIGS. 15A and 15B are views for describing a method of correcting an object range based on a necessity level of lane change.
Figure 15B:
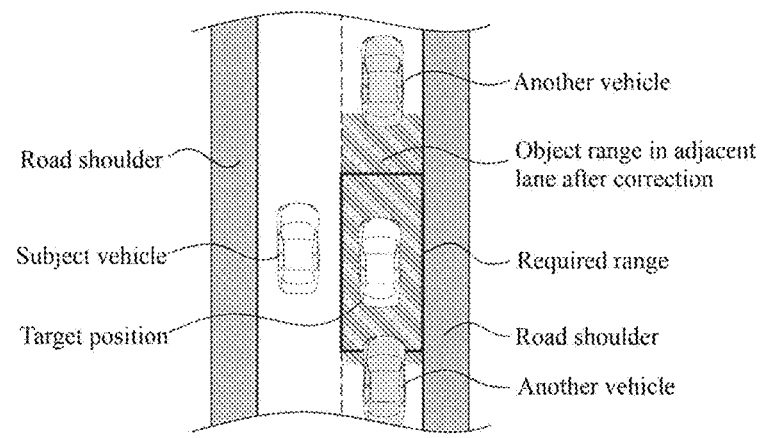

For example, the control device 190 can use the lane change control function to correct the object range in the adjacent lane in accordance with the necessity level of lane change in the travel scene of the subject vehicle as illustrated in FIGS. 15A and 15B instead of using the lane change control function to correct the required range in accordance with the necessity level of lane change in the travel scene of the subject vehicle as illustrated in FIGS. 11A and 11B. Specifically, when the necessity level of lane change is high (when the necessity level of lane change is a predetermined value or higher), the control device 190 can use the lane change control function to increase the length of the object range in the adjacent lane in the travel direction of the subject vehicle as compared with the case of a low necessity level of lane change (the case in which the necessity level of lane change is less than the predetermined value), thereby reducing the object range in the adjacent lane in the travel direction of the subject vehicle. For example, in the example illustrated in FIGS. 15A and 15B, provided that FIG. 15A represents the object range in the adjacent lane before correction, when the necessity level of lane change is high (when the necessity level of lane change is a predetermined value or higher), the control device 190 can use the lane change control function to increase the object range in the adjacent lane in the travel direction of the subject vehicle as illustrated in FIG. 15B. In addition or alternatively, the control device 190 can use the lane change control function to increase the object range in the adjacent lane as the necessity level of lane change in the travel scene of the subject vehicle increases.

Figure 16A:
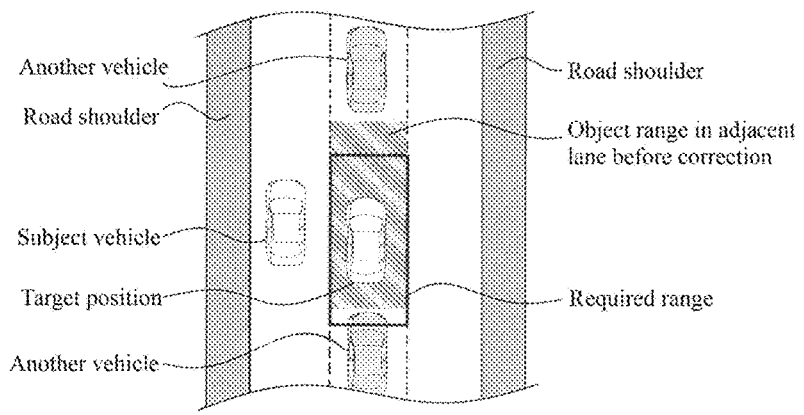
FIGS. 16A and 16B are views for describing a method of correcting an object range based on a situation of a next adjacent lane.
Figure 16B:
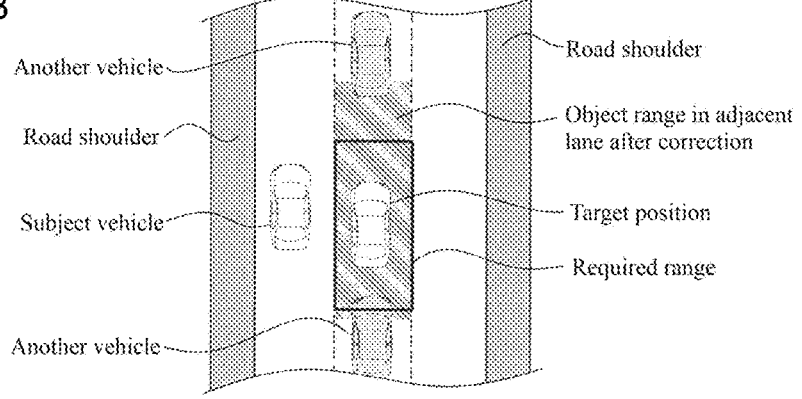

The control device 190 can use the lane change control function to correct the object range in the adjacent lane on the basis of the object range in the next adjacent lane as illustrated in FIGS. 16A and 16B instead of using the lane change control function to correct the required range on the basis of the object range in the next adjacent lane as illustrated in FIGS. 12A and 12B. For example, in the example illustrated in FIGS. 16A and 16B, provided that FIG. 16A represents the object range in the adjacent lane before correction, when a space (e.g. a space corresponding to the required range) to which the adjacent vehicle can change lanes can be detected in the object range in the next adjacent lane, the control device 190 can use the lane change control function to increase the length of the object range in the adjacent lane in the travel direction of the subject vehicle as illustrated in FIG. 16B, thereby increasing the object range in the adjacent lane in the travel direction of the subject vehicle. In addition or alternatively, the control device 190 can use the lane change control function to increase the object range in the adjacent lane in the travel direction of the subject vehicle as the object range in the next adjacent lane increases.

Figure 17A:
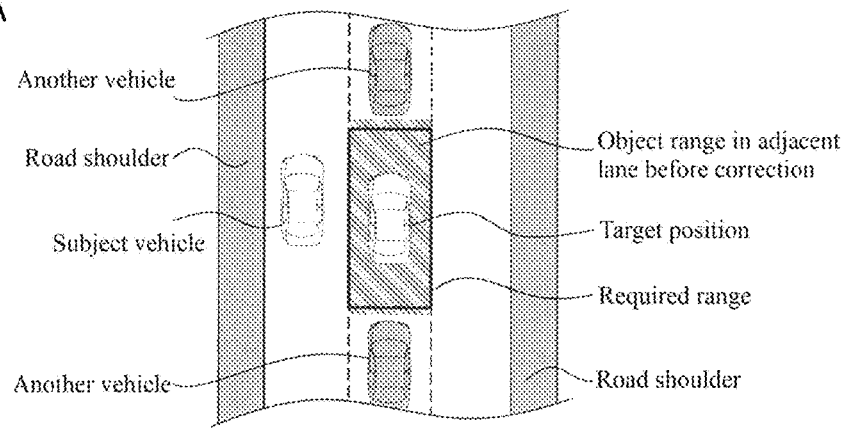
FIGS. 17A-17C are views for describing methods of correcting an object range based on a travel position of an adjacent vehicle in the road width direction.
Figure 17B:
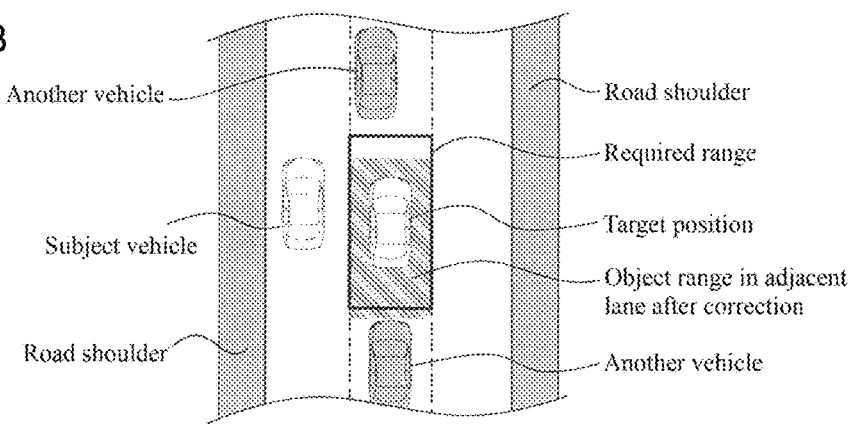
Figure 17C:
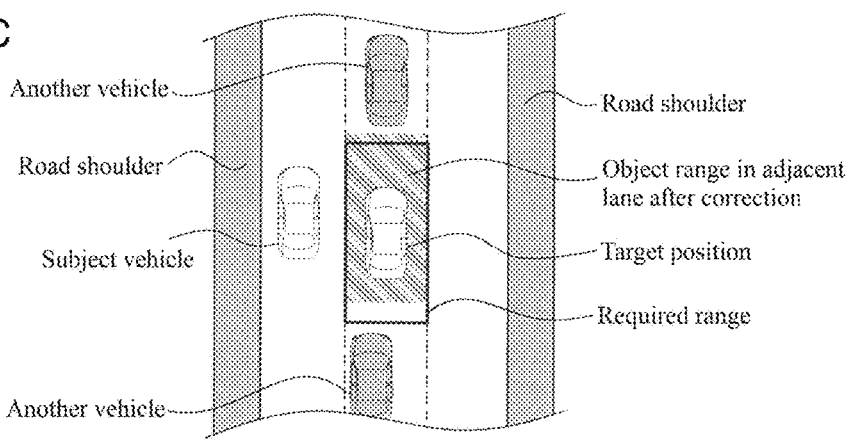

The control device 190 can use the lane change control function to correct the object range on the basis of the travel position in the road width direction of another vehicle traveling in the adjacent lane (adjacent vehicle) as illustrated in FIGS. 17A-17G instead of using the lane change control function to correct the required range on the basis of the travel position of the adjacent vehicle in the road width direction as illustrated in FIGS. 13A-13F. Specifically, the control device 190 uses the lane change control function to detect the travel position of the adjacent vehicle in the road width direction. When the travel position of the adjacent vehicle in the road width direction is nearer to the subject vehicle lane side than the center of the adjacent lane, the control device 190 uses the lane change control function to reduce the object range in the adjacent lane in the travel direction of the subject vehicle. More specifically, the control device 190 uses the lane change control function to reduce the object range in the adjacent lane from ahead of the subject vehicle when the adjacent vehicle travels ahead of the subject vehicle and reduce the object range in the adjacent lane from behind the subject vehicle when the adjacent vehicle travels behind the subject vehicle. For example, in the example illustrated in FIGS. 17A-17C, provided that FIG. 17A represents the object range in the adjacent lane before correction, the control device 190 can use the lane change control function to reduce the object range in the adjacent lane from ahead when the adjacent vehicle travels ahead of the subject vehicle and nearer to the subject vehicle lane side as illustrated in FIG. 17B. When the adjacent vehicle travels behind the subject vehicle and nearer to the subject vehicle lane side as illustrated in FIG. 17C, the control device 190 can use the lane change control function to reduce the object range in the adjacent lane from behind. In addition or alternatively, the control device 190 can use the lane change control function to reduce the object range in the adjacent lane in the travel direction of the subject vehicle as the adjacent vehicle is nearer to the subject vehicle lane side (as the distance in the road width direction from lane marks at the subject vehicle lane side of the adjacent lane to the adjacent vehicle is shorter).

Figure 17D:
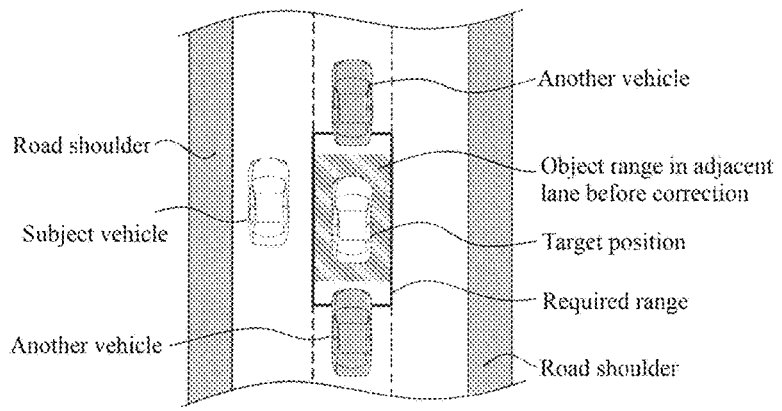
FIGS. 17D-17F are views for describing methods of correcting an object range based on a travel position of an adjacent vehicle in the road width direction.
Figure 17E:
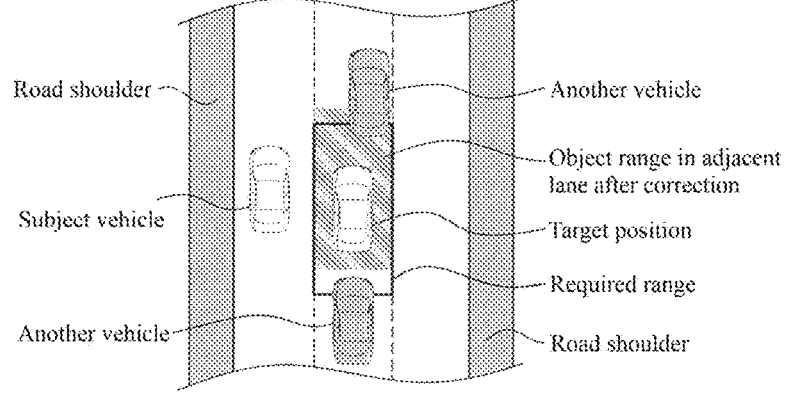
Figure 17F:
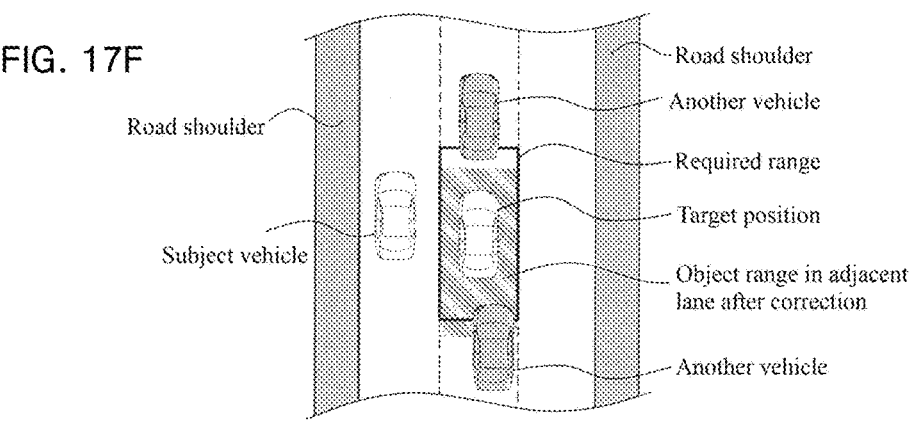

In addition or alternatively, when the travel position of the adjacent vehicle in the road width direction is nearer to the opposite side to the subject vehicle lane than the center of the adjacent lane, the control device 190 can use the lane change control function to increase the object range in the adjacent lane in the travel direction of the subject vehicle. More specifically, the control device 190 uses the lane change control function to increase the object range frontward with respect to the subject vehicle when the adjacent vehicle travels ahead of the subject vehicle and increase the object range in the adjacent lane rearward with respect to the subject vehicle when the adjacent vehicle travels behind the subject vehicle. For example, in the example illustrated in FIGS. 17D-17F, provided that FIG. 17D represents the object range in the adjacent lane before correction, the control device 190 can use the lane change control function to increase the object range in the adjacent lane frontward when the adjacent vehicle travels ahead of the subject vehicle and nearer to the opposite side to the subject vehicle lane as illustrated in FIG. 17E and increase the object range in the adjacent lane rearward when the adjacent vehicle travels behind the subject vehicle and nearer to the opposite side to the subject vehicle lane as illustrated in FIG. 17F. In addition or alternatively, the control device 190 can use the lane change control function to increase the object range in the adjacent lane in the travel direction of the subject vehicle as the adjacent vehicle is nearer to the opposite side to the subject vehicle lane (as the distance in the road width direction from lane marks at the subject vehicle lane side of the adjacent lane to the adjacent vehicle is longer).

Figure 18A:
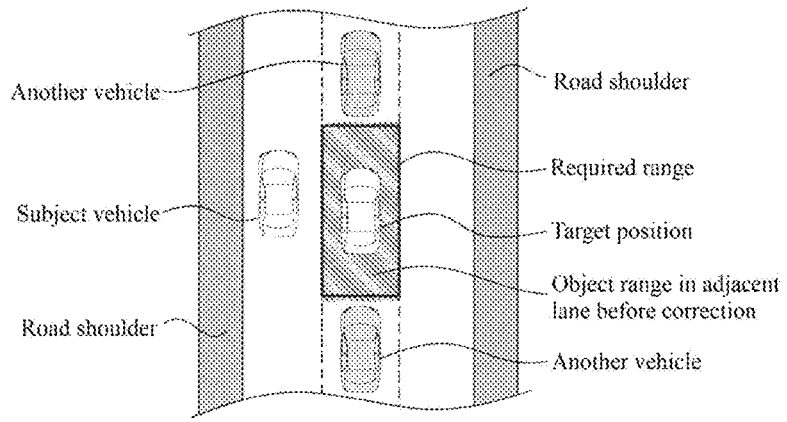
FIGS. 18A-18C are views for describing methods of correcting an object range based on a lighting state of winkers of an adjacent vehicle.
Figure 18B:
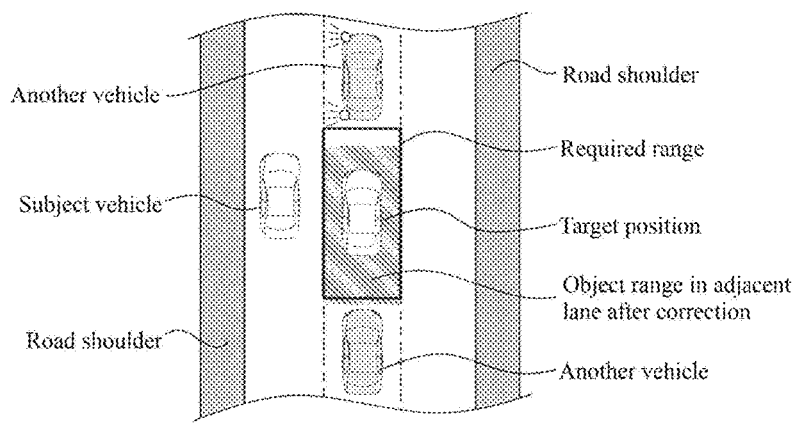
Figure 18C:
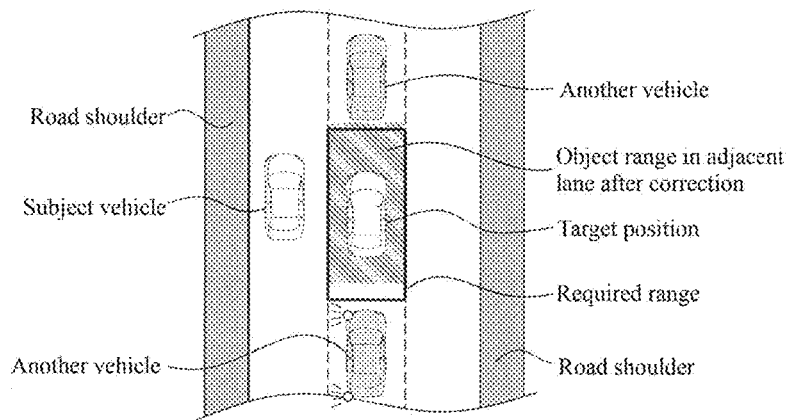

The control device 190 can use the lane change control function to correct the object range in the adjacent lane on the basis of the lighting state of winkers of the adjacent vehicle as illustrated in FIGS. 18A-18F instead of using the lane change control function to correct the required range on the basis of the lighting state of winkers of the adjacent vehicle as illustrated in FIGS. 14A-14F. Specifically, when the adjacent vehicle lights the winkers at the subject vehicle lane side, the control device 190 uses the lane change control function to reduce the length of the object range in the adjacent lane in the travel direction of the subject vehicle thereby to reduce the object range in the adjacent lane. More specifically, the control device 190 uses the lane change control function to reduce the object range in the adjacent lane from ahead when the adjacent vehicle traveling ahead of the subject vehicle lights the winkers at the subject vehicle lane side and reduce the object range in the adjacent lane from behind when the adjacent vehicle traveling behind the subject vehicle lights the winkers at the subject vehicle lane side. For example, in the example illustrated in FIGS. 18A-18C, provided that FIG. 18A represents the object range in the adjacent lane before correction, the control device 190 can use the lane change control function to reduce the object range in the adjacent lane from ahead when the adjacent vehicle travels ahead of the subject vehicle while lighting the winkers at the subject vehicle lane side as illustrated in FIG. 18B. When the adjacent vehicle travels behind the subject vehicle while lighting the winkers at the subject vehicle lane side as illustrated in FIG. 18C, the control device 190 can use the lane change control function to reduce the object range in the adjacent lane from behind.

Figure 18D:
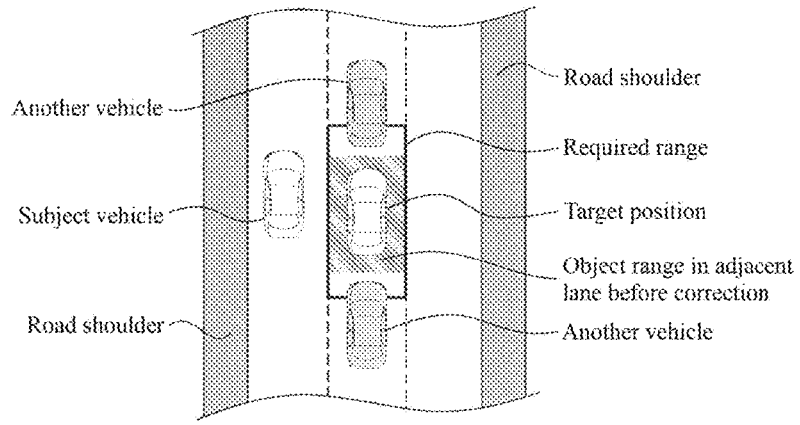
FIGS. 18D-18F are views for describing methods of correcting an object range based on a lighting state of winkers of an adjacent vehicle.
Figure 18E:
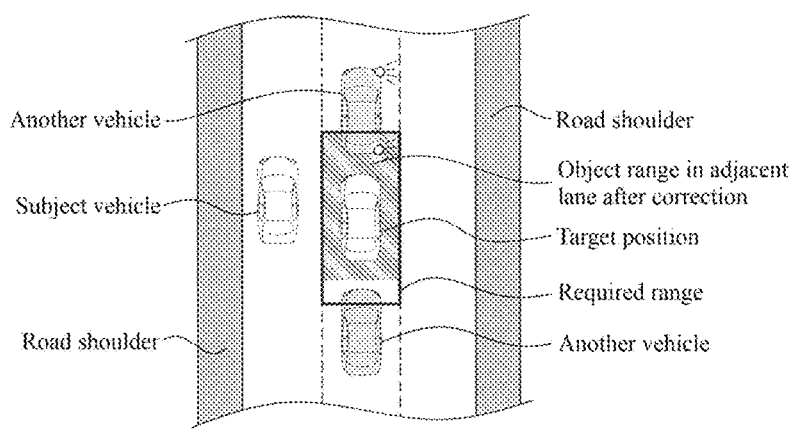
Figure 18F:
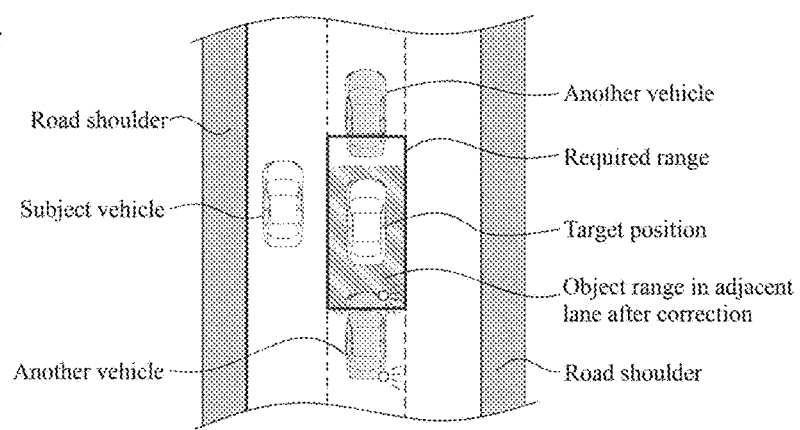

In addition or alternatively, when the adjacent vehicle lights the winkers at the opposite side to the subject vehicle lane, the control device 190 uses the lane change control function to increase the object range in the adjacent lane in the travel direction of the subject vehicle. More specifically, the control device 190 uses the lane change control function to increase the object range in the adjacent lane frontward when the adjacent vehicle traveling ahead of the subject vehicle lights the winkers at the opposite side to the subject vehicle lane and increase the object range rearward when the adjacent vehicle traveling behind the subject vehicle lights the winkers at the opposite side to the subject vehicle lane. For example, in the example illustrated in FIGS. 18D-18F, provided that FIG. 18D represents the object range in the adjacent lane before correction, the control device 190 can use the lane change control function to increase the object range in the adjacent lane frontward when the adjacent vehicle travels ahead of the subject vehicle while lighting the winkers at the opposite side to the subject vehicle lane as illustrated in FIG. 18E. When the adjacent vehicle travels behind the subject vehicle while lighting the winkers at the opposite side to the subject vehicle lane as illustrated in FIG. 18F, the control device 190 can use the lane change control function to increase the object range in the adjacent lane rearward.

The control device 190 can use the lane change control function to correct the object range in the adjacent lane on the basis of the speed and/or acceleration of the adjacent vehicle instead of using the lane change control function to correct the required range on the basis of the speed and/or acceleration of the adjacent vehicle. Specifically, the control device 190 uses the lane change control function to estimate whether or not the adjacent vehicle comes away from the subject vehicle from the speed and acceleration of the adjacent vehicle. When the adjacent vehicle is estimated to come away from the subject vehicle, the control device 190 uses the lane change control function to increase the length of the object range in the adjacent lane in the travel direction of the subject vehicle thereby to increase the object range in the adjacent lane. More specifically, the control device 190 uses the lane change control function to increase the object range in the adjacent lane frontward when the adjacent vehicle traveling ahead of the subject vehicle comes away from the subject vehicle and increase the object range in the adjacent lane rearward behind when the adjacent vehicle traveling behind the subject vehicle comes away from the subject vehicle.

In addition or alternatively, when the adjacent vehicle comes close to the subject vehicle, the control device 190 uses the lane change control function to reduce the length of the object range in the adjacent lane in the travel direction of the subject vehicle thereby to reduce the object range in the adjacent lane in the travel direction of the subject vehicle. More specifically, the control device 190 uses the lane change control function to reduce the object range in the adjacent lane from ahead when the adjacent vehicle traveling ahead of the subject vehicle comes close to the subject vehicle and reduce the object range in the adjacent lane from behind when the adjacent vehicle traveling behind the subject vehicle comes close to the subject vehicle.

The following process will be described on the assumption that the required range is corrected in step S111.

Figure 19A:
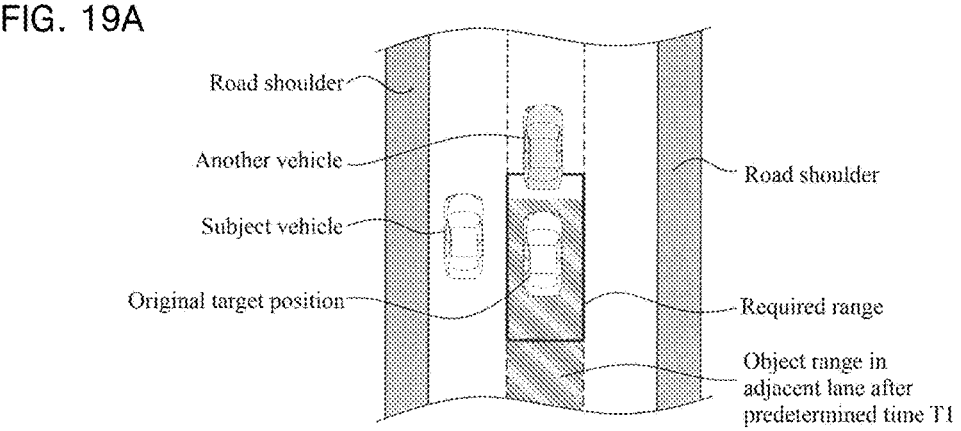
FIGS. 19A and 19B are views for describing a method of determining whether or not lane change should be performed.

In step S112, the control device 190 uses the lane change control function to determine whether or not there is a space within the object range in the adjacent lane after the predetermined time T1. The space corresponds to the required range corrected in step S111. The object range in the adjacent lane after the predetermined time T1 is estimated in step S107. Specifically, as illustrated in FIG. 19A, the control device 190 uses the lane change control function to set the corrected, required range at the target position for lane change which is set in step S105. Then, the control device 190 uses the lane change control function to determine whether or not the object range in the adjacent lane after the predetermined time T1 includes the corrected, required range. For example, in the example illustrated in FIG. 19A, the object range in the adjacent lane after the predetermined time T1 does not include the corrected, required range. The control device 190 therefore uses the lane change control function to determine that there is not a space corresponding to the corrected, required range within the object range in the adjacent lane after the predetermined time T1. On the other hand, when the object range in the adjacent lane after the predetermined time T1 includes the corrected, required range, the control device 190 uses the lane change control function to determine that there is a space corresponding to the corrected, required range within the object range in the adjacent lane after the predetermined time T1. When there is a space corresponding to the corrected, required range within the object range in the adjacent lane after the predetermined time T1, the routine proceeds to step S114 illustrated in FIG. 4 while when there is no space, the routine proceeds to step S113.

Figure 19B:
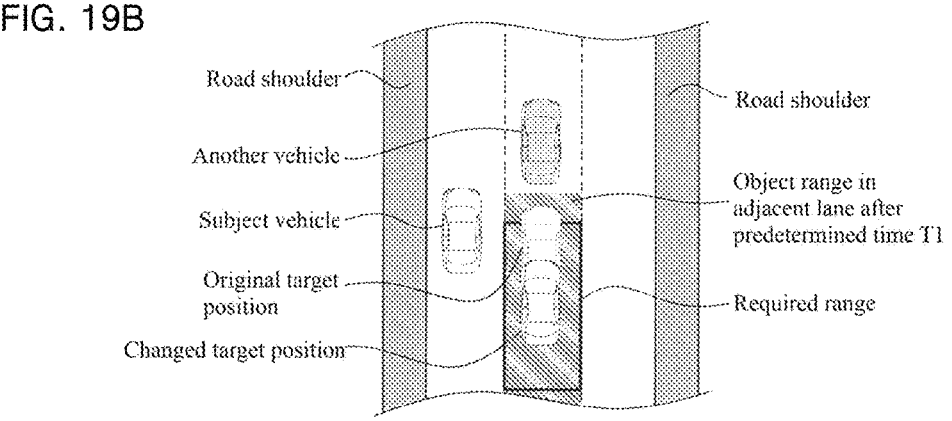

In step S113, it has been determined that the object range in the adjacent lane after the predetermined time T1 does not include the corrected, required range and a space cannot be detected which corresponds to the required range within the object range in the adjacent lane after the predetermined time T1. In step S113, therefore, the control device 190 uses the lane change control function to change the target position for lane change. Specifically, the control device 190 uses the lane change control function to re-set the target position for lane change so that the object range in the adjacent lane after the predetermined time T1 includes the corrected, required range. For example, when the front portion of the required range is not included in the object range in the adjacent lane after the predetermined time T1 as illustrated in FIG. 19A, the target position for lane change is shifted rearward. This allows the corrected, required range to be included in the object range in the adjacent lane after the predetermined time T1 as illustrated in FIG. 19B, and it is determined that a space can be detected which corresponds to the required range within the object range in the adjacent lane after the predetermined time T1. Step S113 is followed by step S106 from which detection of the object range and the like are performed again.

On the other hand, when, in step S112, it is determined that the object range in the adjacent lane after the predetermined time T1 includes the corrected, required range, the routine proceeds to step S114 illustrated in FIG. 4. In step S114, the control device 190 uses the lane change control function to perform a query process for the lane change control. The lane change control refers to control for executing lane change. In step S114, a query as to whether or not the lane change control should be executed is made to the driver before the lane change is actually performed. Then, in step S115, a determination is made whether or not the driver permits the lane change in response to the query of step S114. When the driver permits the lane change, the routine proceeds to step S116 while when the driver does not permit the lane change, the routine returns to step S101.

For example, in step S104, the control device 190 can use the lane change control function to display a message "Which action do you select for the preceding vehicle?" together with query information on the display of the announcement device 150. The query information may include options of "Follow" and "Change lanes to overtake." In response to this, the driver can select any of the options via the input device 160. For example, when the driver selects the option of "Change lanes to overtake," the lane change control function is used in step S115 to determine that the driver permits the lane change, and the routine proceeds to step S116. On the other hand, when the driver selects the option of "Follow," the lane change control function is used in step S115 to determine that the driver does not permit the lane change, and the routine returns to step S101.

The control device 190 can also use the lane change control function to present a message "Which action do you select for the preceding vehicle?" together with options of "Follow" and "Change lanes to overtake" as query information and announce the query information to the driver such that the query information further includes a message "Selection will be automatically performed unless a select button is pressed within X seconds." In this case, when the driver does not select any of the options within a certain period of time, the control device 190 can use the lane change control function to automatically select a predetermined default option among the options of "Follow" and "Change lanes to overtake." The default option may be a specific option or may also be an option that can be variably set. For example, when the object range becomes small in the certain period of time until the default option is selected, the control device 190 can use the lane change control function to set "Follow" as the default option while when the object range becomes large, the control device 190 can use the lane change control function to set "Change lanes to overtake" as the default option. The control device 190 can also use the lane change control function to set an option which the driver has selected many times in past times as the default option on the basis of the history of selection of options by the driver. When the driver selects the option of "Change lanes to overtake" within the certain period of time, the routine proceeds to step S116 while when the driver selects the option of "Follow" within the certain period of time, the routine returns to step S101.

The control device 190 can also use the lane change control function to announce messages, such as "Now changing lanes to overtake the preceding vehicle" and "Please press the cancel button below if discontinuing the lane change," together with query information including a "Cancel" button for canceling the lane change to the driver via the announcement device 150. In this case, it is assumed that, after the query information is announced in step S114, the driver permits the lane change in step S115, and the routine proceeds to step S117. Then, in step S117, the lane change control is initiated. When the driver presses the "Cancel" button, the lane change control is canceled and the routine returns to step S101.

In step S116, the control device 190 uses the lane change control function to acquire the time limit for lane change. In the present embodiment, as illustrated in FIG. 2, the table stores the time for the subject vehicle to approach a point at which lane change is difficult in each travel scene, as the time limit. The control device 190 uses the lane change control function to refer to the table illustrated in FIG. 2 to acquire the time limit (Z) in the travel scene of the subject vehicle. For example, in the "scene of catching up with a preceding vehicle" among the examples illustrated in FIG. 2, the time limit is stored as (time-to-contact with the preceding vehicle—α) seconds. In this case, the control device 190 uses the travel control function to refer to the table illustrated in FIG. 2 to calculate the time-to-contact (TTC) with the preceding vehicle and acquire (the calculated time-to-contact (TTC) with the preceding vehicle—α) seconds as the time limit. The constant α is some seconds (e.g. 5 seconds) and can be appropriately set for each travel scene. For example, when the time-to-contact (TTC) with the preceding vehicle is 30 seconds and α is 5 seconds, the time limit for lane change is 25 seconds.

In step S117, the control device 190 uses the lane change control function to initiate the lane change control. Specifically, the control device 190 uses the lane change control function to allow the drive control device 180 to initiate control of the operation of the steering actuator so that the subject vehicle moves to the target position for lane change set in step S105 or step S113.

In steps S118 to S122, as in steps S104 and S106 to S109, the current object range and the object range after a required time T2 for the subject vehicle to move to the target position are detected (steps S118 to S120) and estimation is made whether the object range becomes small after the predetermined time T2 (step S121). When the object range is estimated to become small after the predetermined time T2 (step S121=Yes), the announcement information that the object range will become small is announced to the driver (step S122).

Then, in step S123, the control device 190 uses the lane change control function to determine whether or not there is a space within the object range in the adjacent lane after the predetermined time T2. The space corresponds to the required range corrected in step S111. The object range in the adjacent lane after the predetermined time T2 is estimated in step S120. The control device 190 uses the lane change control function to set the corrected, required range at the target position for lane change. When the object range in the adjacent lane after the predetermined time T2 includes the corrected, required range, the control device 190 uses the lane change control function to determine that there is a space corresponding to the required range within the object range in the adjacent lane after the predetermined time T2, and the routine proceeds to step S124. On the other hand, when a determination is made that there is not a space corresponding to the required range within the object range in the adjacent lane after the predetermined time T2, the routine proceeds to step S128.

In step S124, the control device 190 uses the lane change control function to determine whether or not the time limit Z acquired in step S117 has passed after initiating the lane change control in step S116. When the elapsed time S1 after initiating the lane change control exceeds the time limit Z, the routine proceeds to step S127 while when the elapsed time S1 after initiating the lane change control does not exceed the time limit Z, the routine proceeds to step S125.

In step S125, the control device 190 uses the lane change control function to determine whether or not the subject vehicle has reached the target position for lane change. When the subject vehicle has reached the target position for lane change, the lane change control is finished in step S126 to complete the lane change control process. Thus, the lane change of the subject vehicle is completed. On the other hand, when the subject vehicle has not reached the target position for lane change, the routine returns to step S118 to continue the lane change control.

When, in step S124, the elapsed time S1 after initiating the lane change control exceeds the time limit Z, that is, when the subject vehicle cannot reach the target position for lane change even after the time limit Z has passed after initiating the lane change control, the routine proceeds to step S127. In step S127, the control device 190 uses the lane change control function to perform a discontinuation process for the lane change control. Specifically, the control device 190 uses the lane change control function to announce the information that the lane change control will be discontinued to the driver. For example, the control device 190 can use the lane change control function to announce a message "Lane change will be discontinued due to time out" to the driver via the announcement device 150. Thereafter, the lane change control function is finished in step S126 and the routine returns to step S101. In the discontinuation process for the lane change control, the control device 190 may use the lane change control function to leave the travel position of the subject vehicle in the road width direction at the position when finishing the lane change control or recover the travel position to the position when initiating the lane change control. When the travel position is recovered to the position when initiating the lane change control, a message such as "The original position will be recovered due to time out" may be announced to the driver.

In the discontinuation process for the lane change control, the control device 190 can use the lane change control function to determine whether the driver desires to continue the lane change while maintaining the current travel state. When the driver desires to continue the lane change, the time limit Z may be extended. For example, the control device 190 can use the lane change control function to present some announcement information to the driver. The announcement information may include a message "Continue lane change despite time out?" and options of "Discontinue" and "Continue." When the driver selects the option of "Continue," the control device 190 uses the lane change control function to elongate the time limit Z, and the routine returns to step S118. When the driver selects the option of "Discontinue," the lane change control is finished in step S126.

The control device 190 may use the lane change control function to provide a time for response when determining whether the driver desires to continue the lane change and automatically execute the default option if the driver does not make a response within the time for response. For example, the query information can be announced to the driver, including a message "Selection will be automatically performed unless a select button is pressed within XX seconds" in addition to a message "Continue lane change despite time out?" and options of "Discontinue" and "Continue." The time for response and the default option may be a specific time and a specific option or may also be variably set. In an example in which the time for response and the default option are variably set, the time for response can be reduced or "Discontinue" can be set as the default option when the object range becomes small. In addition or alternatively, the history of selection by the driver may be used to reduce the time for response to an option which the driver has selected few times in past times or set an option which the driver has selected many times in past times as the default option. When the option of "Continue" is selected, the time limit Z is elongated and the routine then returns to step S118 while when the option of "Discontinue" is selected, the lane change control is finished in step S126.

In the discontinuation process for the lane change control, the control device 190 can also use the lane change control function to automatically continue the lane change and announce a method of discontinuing the lane change to the driver. For example, the control device 190 can use the lane change control function to announce messages, such as "Lane change will be continued despite time out" and "Please press the cancel button below if discontinuing the lane change," together with announcement information including a "Cancel" button for canceling the lane change to the driver via the announcement device 150. In this case, when the "Cancel" button is not pressed, the time limit Z is elongated and the routine then returns to step S118. When the "Cancel" button is pressed, the lane change control is finished in step S126.

In the discontinuation process for the lane change control, when the time limit Z is elongated to continue the lane change, the time limit Z is elongated within a time in which the lane change can be continued. For example, provided that the travel scene of the subject vehicle is a "scene of approaching a merging point," when the time for arriving at the merging point is 10 seconds but the time limit Z is 7 seconds, that is, when the time for arriving at the merging point exceeds the time limit Z, the control device 190 can use the lane change control function to elongate the time limit Z, for example, up to 9 seconds to continue the lane change. In this case, if the elongated time limit Z (9 seconds) passes, the lane change control will be finished.

Thus, when the elapsed time S1 after initiating the lane change control exceeds the time limit Z, the discontinuation process for the lane change control can be performed thereby to effectively prevent uncomfortable feeling given to the driver. This will be more specifically described. For example, if the lane change is not performed even when the time limit Z has passed after initiating the lane change control, the intention of the driver to change lanes may disappear. In such a case, uncomfortable feeling may be given to the driver if the lane change is performed after the driver has changed mind so as not to desire lane change or if the lane change is performed when the driver forgets it. The discontinuation process for the lane change control can mitigate such uncomfortable feeling given to the driver.

In step S123, when a determination is made that there is not a space corresponding to the required range within the object range in the adjacent lane after the predetermined time T2, the routine proceeds to step S128. That is, when there was a space corresponding to the required range within the object range in the adjacent lane at the time point of step S112 of initiating the lane change control but there is not a space corresponding to the required range within the object range in the adjacent lane after initiating the lane change control, the routine proceeds to step S128. In step S123, also when the object range in the adjacent lane at the time point of step S112 of initiating the lane change control becomes small at the time point of step S123, the routine may proceed to step S128. In step S128, detection is performed for the positional relationship in the road width direction between the subject vehicle and lane marks which the subject vehicle will get across when changing lanes (referred to as "object lane marks," hereinafter).

Figure 20A:
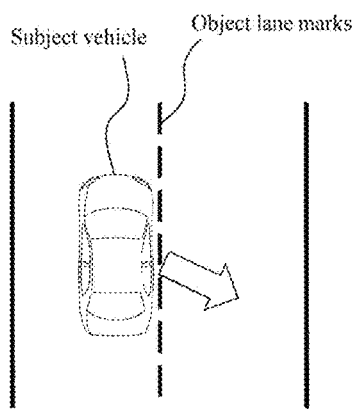
FIGS. 20A-20D are views for describing the positional relationship between object lane marks and the subject vehicle in the road width direction.
Figure 20B:
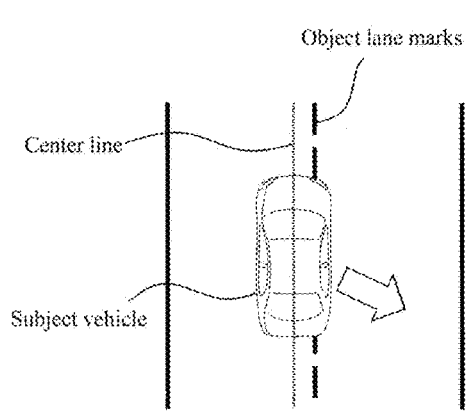
Figure 20C:
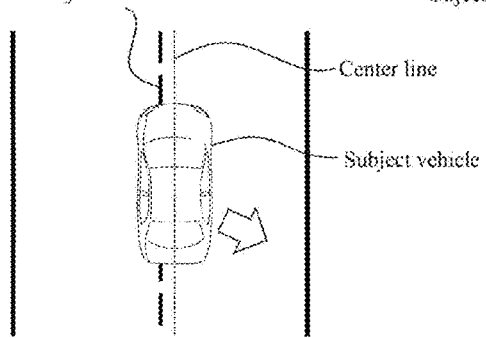
Figure 20D:
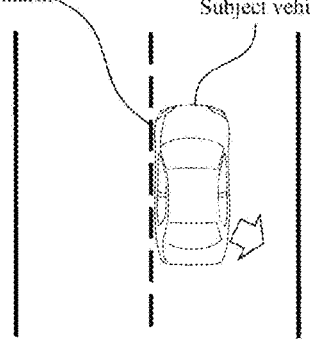

For example, FIGS. 20A-20D exemplify a scene in which the subject vehicle changes lanes in the direction represented by arrows in the figure (lane change from the left-side lane to the right-side lane in the figure). In this case, the control device 190 uses the lane change control function to determine any of a state in which no part of the subject vehicle gets across the object lane marks as illustrated in FIG. 20A, a state in which a part of the subject vehicle gets across the object lane marks but the center line of the subject vehicle does not get across the object lane marks as illustrated in FIG. 20B, a state in which the whole of the subject vehicle does not completely get across the object lane marks but the center line of the subject vehicle gets across the object lane marks as illustrated in FIG. 20C, and a state in which the whole of the subject vehicle gets across the object lane marks as illustrated in FIG. 20D.

In step S129, the control device 190 uses the lane change control function to perform a control process for discontinuing or continuing the lane change, on the basis of the positional relationship in the road width direction between the object lane marks and the subject vehicle determined in step S128. Specifically, the control device 190 uses the lane change control function to determine (a) a method of presenting information to the driver when discontinuing or continuing lane change, (b) control after discontinuing or continuing lane change, and (c) a travel position of the subject vehicle when discontinuing or continuing lane change, on the basis of the positional relationship in the road width direction between the object lane marks and the subject vehicle.

For example, the control device 190 can use the lane change control function to carry out any of the following four methods as the method (a) of presenting information to the driver when discontinuing or continuing lane change: (a1) a method that includes presenting information for allowing the driver to select between options of discontinuing and continuing lane change without time limit and, when the driver selects any of the options, executing the option (discontinuing or continuing lane change) selected by the driver; (a2) a method that includes presenting information for allowing the driver to select between options of discontinuing and continuing lane change with time limit and, when the driver selects any of the options within the time limit, executing the option (discontinuing or continuing lane change) selected by the driver or, when the driver does not select both the options within the time limit, executing control (default control) of a predetermined option among the options of discontinuing and continuing lane change; (a3) a method that includes automatically executing discontinuation or continuation of lane change and expressly providing the driver with a method of canceling the discontinuation or continuation of lane change which is automatically executed; and (a4) a method that includes automatically executing discontinuation or continuation of lane change without expressly providing the driver with a method of canceling the discontinuation or continuation of lane change which is automatically executed.

The control device 190 can also use the lane change control function to carry out any of the following three control schemes as (b) control contents after discontinuing or continuing lane change: (b1) a scheme that includes discontinuing the lane change and also discontinuing the automatic travel control; (b2) a scheme that includes discontinuing only the lane change control and continuing the automatic travel control; and (b3) a scheme that includes suspending the lane change control into a waiting state until a space corresponding to the required range is detected again within the object range in the adjacent lane and resuming the lane change control when a space corresponding to the required range is detected again within the object range in the adjacent lane.

The control device 190 can further use the lane change control function to carry out any of the following three positional adjustment schemes for the travel position (c) of the subject vehicle when discontinuing or continuing the lane change control: (c1) a scheme that includes recovering the position of the subject vehicle to the original position before initiating the lane change; (c2) a scheme that includes moving the subject vehicle to a position in the vicinity of the object lane marks in the lane in which the subject vehicle traveled before initiating the lane change; and (c3) a scheme that includes maintaining the current position.

The control device 190 can use the lane change control function to perform the control process for discontinuing or continuing lane change by appropriately combining two or more of the method (a) of presenting information to the driver when discontinuing or continuing lane change, (b) control contents after discontinuing or continuing lane change, and (c) a travel position of the subject vehicle when discontinuing or continuing lane change, on the basis of the positional relationship in the road width direction between the object lane marks and the subject vehicle.

For example, when no part of the subject vehicle gets across the object lane marks as illustrated in FIG. 20A, the control device 190 can use the lane change control function to carry out the method (a4) that includes automatically executing discontinuation of lane change without expressly providing the driver with a method of canceling the discontinuation of lane change. In this case, the control device 190 can use the lane change control function to carry out the scheme (b1) that includes discontinuing the lane change and also discontinuing the automatic travel control and the scheme (c1) that includes recovering the position of the subject vehicle to the original position before initiating the lane change. In such a case, the control device 190 can use the lane change control function to announce the control contents to be performed from that time to the driver, such as "Position will be recovered to the original position because the space for lane change may be insufficient" and "Automatic travel control will be canceled after recovery to the original position." In this case, the process proceeds to step S126 to finish the lane change control.

When a part of the subject vehicle gets across the object lane marks but the center line of the subject vehicle does not get across the object lane marks as illustrated in FIG. 20B, the control device 190 can use the lane change control function to carry out the method (a3) that includes automatically executing discontinuation of lane change and expressly providing the driver with a method of canceling the discontinuation of lane change. In this case, the control device 190 can use the lane change control function to carry out the scheme (c2) that includes moving the subject vehicle to a position in the vicinity of the object lane marks in the lane in which the subject vehicle traveled before initiating the lane change and then carry out the scheme (b2) that includes discontinuing only the lane change control and continuing the automatic travel control. In such a case, the control device 190 can use the lane change control function to announce the control contents to be performed from that time to the driver, such as "Position will be recovered into the original lane because the space for lane change may be insufficient" and "Previous automatic travel control will be continued after recovery to the original position." In addition or alternatively, the control device 190 can use the lane change control function to display a message "Please press the button below if lane change should be continued" together with a button for continuing the lane change. When the driver presses the button for continuing lane change, the process proceeds to step S130 while when the driver does not press the button for continuing lane change, the process proceeds to step S126.

When the whole of the subject vehicle does not completely get across the object lane marks but the center line of the subject vehicle gets across the object lane marks, for example, as illustrated in FIG. 20C, the control device 190 can use the lane change control function to carry out the method (a4) that includes automatically executing continuation of lane change without expressly providing the driver with a method of canceling the continuation of lane change. In this case, the control device 190 can use the lane change control function to carry out the scheme (c3) that includes waiting while maintaining the travel position of the subject vehicle at the current position and the scheme (b3) that includes suspending the lane change control until a space corresponding to the required range is detected again within the object range in the adjacent lane and resuming the lane change control when a space corresponding to the required range is detected again within the object range in the adjacent lane. In this case, for example, the control device 190 can use the lane change control function to announce the control contents to be performed from that time to the driver, such as "Waiting will be conducted at the current position because the space for lane change may be insufficient" and "Lane change control will be resumed if a space for lane change is found." In this case, the process proceeds to step S130.

When the whole of the subject vehicle gets across the object lane marks, for example, as illustrated in FIG. 20D, the control device 190 can use the lane change control function to carry out the method (a4) that includes automatically executing discontinuation of lane change without expressly providing the driver with a method of canceling the discontinuation of lane change. In this case, the control device 190 can use the lane change control function to carry out the scheme (c3) that includes maintaining the travel position of the subject vehicle at the current position and the scheme (b2) that includes discontinuing only the lane change control and continuing the automatic travel control. In this case, for example, the control device 190 can use the lane change control function to announce the control contents to be performed from that time to the driver, such as "Waiting will be conducted at the current position because the space for lane change may be insufficient" and "Previous automatic travel control will be continued." In this case, the process proceeds to step S126 to finish the lane change control.

The positional relationship in the road width direction between the object lane marks and the subject vehicle is not limited to the four scenes illustrated in FIGS. 20A to 20D and five or more or three or less possible scenes may be employed. The combination of control schemes for each positional relationship is not limited to the above-described combinations. Any combination is possible among two or more of the method (a) of presenting information to the driver when discontinuing or continuing lane change, (b) control contents after discontinuing or continuing lane change, and (c) a travel position of the subject vehicle when discontinuing or continuing lane change.

Description will then be made for a case in which continuation of lane change is executed in step S129. Step S129 of initiating the continuation of lane change is followed by step S130. In step S130, the control device 190 uses the lane change control function to measure an elapsed time S2 after the lane change control comes to a waiting state in step S129. That is, in the present embodiment, when the lane change is continued in step S129, the lane change is suspended and the lane change control comes to a waiting state until a space corresponding to the required range is detected again in the object range in the adjacent lane. In step S130, the elapsed time S2 after initiating the waiting of the lane change control in this manner is measured.

In step S131, the control device 190 uses the lane change control function to estimate a required time T3 for the subject vehicle to move from the current position to the target position for lane change. The required time T3 can be estimated as in step S106.

In step S132, the control device 190 uses the lane change control function to determine whether or not the total time (S2+T3) of the elapsed time S2 measured in step S130 and the required time T3 estimated in step S131 exceeds the time limit Z acquired in step S118. When the total time (S2+T3) exceeds the time limit Z, the routine proceeds to step S133 in which the control device 190 uses the lane change control function to cancel the waiting state of the lane change control and move the subject vehicle to the travel position of the subject vehicle before initiating the lane change. Step S133 is followed by step S126 in which the lane change control is finished. On the other hand, when the total time (S2+T3) does not exceed the time limit Z, the routine proceeds to step S134.

In step S134, the control device 190 uses the lane change control function to continue the waiting state of the lane change control. Step S134 is followed by steps S135 to S138 in which, as in steps S104 and S106 to S109, the current object range and the object range after the required time T3 are detected (steps S135 and S136) and estimation is made whether or not the object range becomes small after the predetermined time T3 (step S137). When the object range is estimated to become small after the predetermined time T3 (step S137=Yes), the announcement information that the object range will become small is announced to the driver (step S138).

In step S139, as in step S123, a determination is made whether or not there is a space within the object range in the adjacent lane after the predetermined time T3. The space corresponds to the required range corrected in step S111. The object range in the adjacent lane after the predetermined time T3 is estimated in step S136. The control device 190 uses the lane change control function to set the corrected, required range at the target position for lane change. When the object range in the adjacent lane after the predetermined time T3 includes the corrected, required range, the control device 190 uses the lane change control function to determine that there is a space corresponding to the required range within the object range in the adjacent lane after the predetermined time T3, and the routine proceeds to step S140. In step S140, the control device 190 uses the lane change control function to cancel the waiting state of the lane change control and resume the lane change control because a space corresponding to the required range is detected within the object range in the adjacent lane. The process then returns to step S118. On the other hand, when a determination is made that there is not a space corresponding to the required range within the object range in the adjacent lane after the predetermined time T3, the routine proceeds to step S141 in which the waiting state of the lane change control is continued, and the routine then returns to step S130.

As described above, when determining whether or not to permit lane change, the travel control apparatus 100 according to the present embodiment sets a range as a required range at a target position for lane change. The range has a size equal to or larger than the size of a range which the subject vehicle occupies on a road surface. The travel control apparatus 100 also detects a range in which no obstacles exist at the timing when the subject vehicle completes the lane change, as an object range. Then, when the object range in the adjacent lane includes the required range, the travel control apparatus 100 determines that a space to which the subject vehicle can change lanes exists in the adjacent lane, and permits the lane change. Thus, in the present embodiment, the object range in which no obstacles exist at the timing when the subject vehicle completes the lane change and the required range necessary for the subject vehicle to change lanes are compared thereby to allow a determination to be appropriately made as to whether or not lane change should be performed.

Moreover, in the present embodiment, the object range after a predetermined time is estimated. The predetermined time may be a time required for the subject vehicle to reach the target position for lane change. When it is estimated that the object range in the adjacent lane after the predetermined time becomes small as compared with the current object range in the adjacent lane, the announcement information that the object range will become small is announced to the driver. In the present embodiment, even while the subject vehicle executes lane change, it is repeatedly estimated whether or not the object range in the adjacent lane becomes small after the predetermined time, and the change of the object range in the adjacent lane after the predetermined time is announced as the announcement information to the driver. Through this operation, even when the lane change is not performed because the object range after the predetermined time will become small, the driver can appropriately perceive the reason that the lane change is not performed.

Furthermore, in the present embodiment, when the announcement information that the object range will become small is announced to the driver, the announcement information is announced so that the driver can visually confirm the disappearance ranges which will disappear from the object range after the predetermined time, as illustrated in FIG. 9C and FIG. 10. This allows the driver to appropriately perceive how the space to which lane change is possible becomes small. In addition or alternatively, the announcement information may be announced so that the driver can visually confirm the additional range which will be added to the object range after the predetermined time, as illustrated in FIG. 9C and FIG. 10. This allows the driver to appropriately perceive the space to which lane change is possible after the predetermined time.

In the present embodiment, the display form of the disappearance range or the object range after the predetermined time can be changed between a case in which the disappearance range has a size that is a predetermined range or more and a case in which the disappearance range has a size that is less than the predetermined range. For example, when the disappearance range has a size that is the predetermined range or more, the disappearance range or the object range after the predetermined time can be displayed in an emphasized manner, such as in red color and in a blinking manner. In addition or alternatively, the display form of the object range after the predetermined time can be changed between a case in which the object range after the predetermined time has a size that is a predetermined range or more and a case in which the object range after the predetermined time has a size that is less than the predetermined range. For example, when the object range after the predetermined time has a size that is less than the predetermined range, the object range after the predetermined time can be displayed in an emphasized manner, such as in red color and in a blinking manner. In addition or alternatively, when a rate with which the object range becomes small is a predetermined rate or more, the object range after the predetermined time can be displayed in an emphasized manner, such as in red color and in a blinking manner, as compared with when the rate with which the object range becomes small is less than the predetermined rate. This allows the driver to more appropriately perceive that the object range will become small.

Second Embodiment

Figure 21:
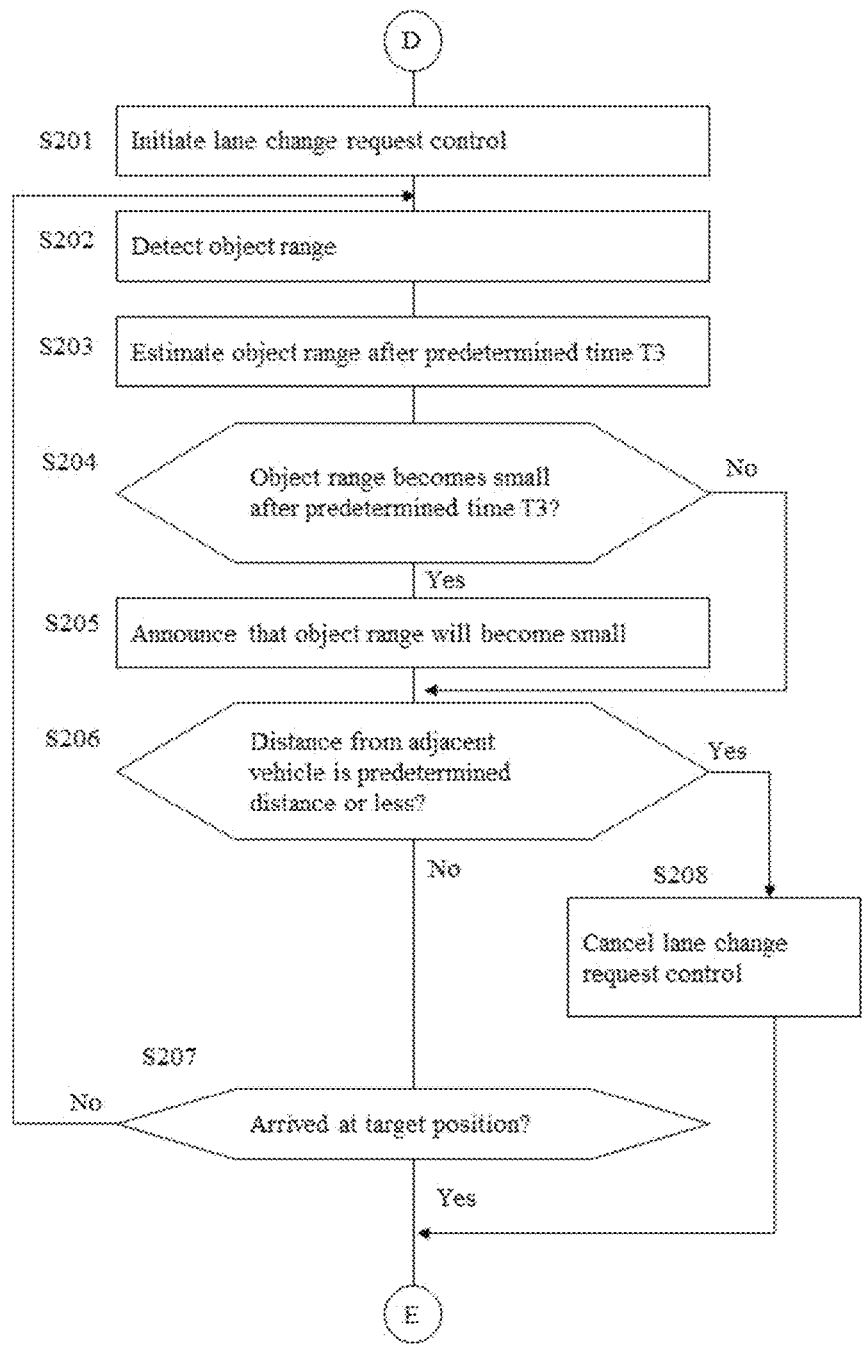
FIG. 21 is a flowchart illustrating a lane change control process according to a second embodiment of the present invention.

Next, the travel control apparatus according to a second embodiment of the present invention will be described. The travel control apparatus 100 according to the second embodiment has the same configuration as that of the travel control apparatus 100 according to the first embodiment and operates in the same manner as in the first embodiment except that the travel control apparatus 100 operates as described below. Specifically, in the second embodiment, the travel control apparatus 100 performs a lane change control process illustrated in FIG. 21 as substitute for the lane change control process illustrated in FIG. 5.

This will be more specifically described. When, in step S123 illustrated in FIG. 4, a determination is made that a space corresponding to the required range cannot be detected within the object range in the adjacent lane after the predetermined time T2, the routine proceeds to step S201 illustrated in FIG. 21. In step S201, the control device 190 uses the lane change control function to initiate a lane change request control for slowly bringing the subject vehicle close to the target position for lane change. The lane change request control is control that includes slowly bringing the subject vehicle close to the target position for lane change so that the driver of another vehicle entering the object range in the adjacent lane perceives that the subject vehicle will change lanes, asking for the drive of the other vehicle to provide a lane change space that includes the target position for lane change, and allowing the subject vehicle to change lanes. In the lane change request control, the control device 190 uses the lane change control function to move the subject vehicle in the road width direction at a lower speed than that when performing ordinary lane change. For example, the control device 190 can use the lane change control function to move the subject vehicle in the road width direction at half speed as compared with the case of changing lanes, thereby to slowly bring the subject vehicle close to the target position for lane change.

In step S201, the control device 190 can use the lane change control function to change the moving speed of the subject vehicle in the road width direction by taking into account a degree that the corrected, required range deviates from the object range after the predetermined time T2. For example, when the degree that the corrected, required range deviates from the object range after the predetermined time T2 is a predetermined value or more, the control device 190 can use the lane change control function to change the moving speed of the subject vehicle in the road width direction to a lower speed than the speed when the degree is less than the predetermined value. When the degree that the corrected, required range deviates from the object range after the predetermined time T2 is large, another vehicle is highly likely to enter the target position for lane change of the subject vehicle accordingly. In such a case, if the subject vehicle is brought close to the target position for lane change, the driver is liable to feel anxious. Such anxious feeling of the driver to another vehicle can therefore be mitigated by reducing the moving speed of the subject vehicle in the road width direction (i.e. by more slowly bringing the subject vehicle close to the target position for lane change).

In addition or alternatively, in step S201, the control device 190 can use the lane change control function to change the moving speed of the subject vehicle in the road width direction in accordance with the positional relationship between the object lane marks and the subject vehicle detected in step S128. For example, in a state in which the center line of the subject vehicle gets across the lane marks as illustrated in FIG. 20C, the control device 190 can use the lane change control function to reduce the moving speed of the subject vehicle in the road width direction. This operation can mitigate the anxious feeling of the driver even when the subject vehicle is moved to the target position for lane change in a state in which the subject vehicle and another vehicle are close to each other so that they may come closer to each other. In addition or alternatively, in a state in which the center line of the subject vehicle gets across the lane marks, the control device 190 can use the lane change control function to make the moving speed "0," that is, to maintain the position of the subject vehicle in the road width direction (i.e. to wait at the current position) rather than varying the position. This can mitigate the anxious feeling of the driver because the subject vehicle does not come close to the other vehicle.

Processes in steps S202 to S205 are the same as those in steps S135 to S138, so the description will be omitted. Then, in step S206, the control device 190 uses the lane change control function to determine whether or not the distance between the subject vehicle and the other vehicle becomes a predetermined distance or less as a result of the lane change request control performed in step S201 for slowly bringing the subject vehicle close to the adjacent vehicle. The distance between the subject vehicle and the other vehicle as used in this case may be a direct distance or a distance in the road width direction. When the distance between the subject vehicle and the other vehicle is larger than the predetermined distance, the routine proceeds to step S207 in which the control device 190 uses the lane change control function to determine whether or not the subject vehicle has arrived at the target position for lane change. When the subject vehicle has not arrived at the target position for lane change, the routine returns to step S202 to continue the lane change request control. When the subject vehicle has arrived at the target position for lane change, the routine returns to step S126 to finish the lane change control.

When, in step S206, a determination is made that the distance between the subject vehicle and the other vehicle becomes the predetermined distance or less, the routine proceeds to step S208. In step S208, the control device 190 uses the lane change control function to cancel the lane change request control initiated in step S201 and the routine then proceeds to step S126 to cancel the lane change control. Even when the subject vehicle is brought close to the target position for lane change, the driver of the other vehicle may not necessarily provide a space necessary for lane change and the subject vehicle may come close to the other vehicle to some extent. In such a case, the lane change request control can be canceled thereby to allow the subject vehicle to travel in safety.

In step S206, the control device 190 can also use the lane change control function to set the above predetermined distance variable in accordance with the "necessity level of lane change" in the scene in which the subject vehicle travels. For example, when the "necessity level of lane change" in the travel scene of the subject vehicle is high (the necessity level is a predetermined value or more), the control device 190 can use the lane change control function to reduce the above predetermined distance as compared with a case in which the "necessity level of lane change" in the travel scene of the subject vehicle is low (the necessity level is less than the predetermined value). This allows the subject vehicle to come closer to the target position for lane change in a travel scene in which the "necessity level of lane change" is high. Accordingly, the adjacent vehicle can be informed of the intention that the subject vehicle will change lanes, and the lane change to the adjacent lane can be readily performed.

As described above, in the second embodiment, when a space corresponding to the required range cannot be detected in the object range in the adjacent lane, the lane change request control is performed to slowly bring the subject vehicle close to the target position for lane change. This allows the driver of the adjacent vehicle to be informed of the intention of lane change of the subject vehicle even when a space corresponding to the required range cannot be detected in the object range in the adjacent lane. As a result, the driver of the adjacent lane may provide a space necessary for lane change of the subject vehicle and the lane change may thus be appropriately performed.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the above-described one or more embodiments of the present invention, a configuration is exemplified in which the required range is compared with the object range in the adjacent lane at the timing when the subject vehicle completes lane change, but the present invention is not limited to this configuration and another configuration can also be employed in which, for example, the required range is compared with the object range in the adjacent lane at the present time.

In the above-described one or more embodiments of the present invention, a configuration is exemplified in which, when the travel scene of the subject vehicle corresponds to a plurality of travel scenes illustrated in FIG. 2, the travel scene in which the necessity level of lane change is highest is determined as the travel scene of the subject vehicle and lane change is performed in the "direction of lane change" in the travel scene, but the present invention is not limited to this configuration and another configuration can also be employed in which, for example, when the travel scene of the subject vehicle corresponds to a plurality of travel scenes illustrated in FIG. 2, the "direction of lane change" in each travel scene is specified as the right direction or the left direction and lane change is performed in the right direction if the "direction of lane change" is the right direction in a larger number of travel scenes while lane change is performed in the left direction if the "direction of lane change" is the left direction in a larger number of travel scenes.

In the above-described one or more embodiments of the present invention, a configuration is exemplified in which the time limit Z for each travel scene is stored in the table as illustrated in FIG. 2, but the present invention is not limited to this configuration and another configuration can also be employed in which the time limit Z is calculated, for example, on the basis of the necessity level of lane change stored in the table illustrated in FIG. 2. In this case, the time limit Z may be set longer as the necessity level of lane change is higher. Still another configuration may also be employed in which a specific time for each travel scene is stored as the time limit Z in the table.

In the above-described one or more embodiments of the present invention, a configuration is exemplified in which a range with no obstacles in the adjacent lane is detected as the object range and a range with no obstacles in the next adjacent lane is also detected as the object range as illustrated in FIG. 6C, but the present invention is not limited to this configuration and another configuration can also be employed in which, for example, the range with no obstacles in the adjacent lane is detected as a first object range while the range with no obstacles in the next adjacent lane is detected as a second object range so that the object range in the adjacent lane and the object range in the next adjacent lane are separately detected.

In the above-described second embodiment, a configuration is exemplified in which the lane change request control is performed for slowly bringing the subject vehicle close to the target position for lane change, but the present invention is not limited to this configuration and another configuration may also be employed in which, for example, the lane change request control is performed for slowly bringing the subject vehicle close to the adjacent lane. Also in this case, the driver of the adjacent vehicle can be informed of the intention of lane change of the subject vehicle, and a space necessary for lane change may thus be ensured.

The sensors 110 in the above-described embodiments correspond to the first detector and second detector of the present invention and the control device 190 corresponds to the travel control apparatus of the present invention.

REFERENCE SIGNS LIST

100 Travel control apparatus
110 Sensors
120 Subject vehicle position detection device
130 Map database
140 Onboard equipment
150 Announcement device
160 Input device
170 Communication device
180 Drive control device
190 Control device

The invention claimed is:

1. A travel control method for a vehicle, the travel control method using:
a first detector configured to detect an obstacle around a subject vehicle traveling in a first lane; and
a second detector configured to detect a second lane adjacent to the first lane,
the travel control method comprising:
setting a first range at a target position for lane change in the second lane, the first range having a size equal to or larger than a size which the subject vehicle occupies on a road surface;
detecting a range in the second lane as a second range, the range in the second lane being located at a side of the subject vehicle, the obstacle being absent in the range in the second lane;
permitting the subject vehicle to change lanes when the second range completely includes the first range;
detecting a travel state of the subject vehicle including a position and a speed of the subject vehicle;
acquiring obstacle information including a position and a speed of the obstacle;
estimating the second range after a predetermined time on a basis of the travel state of the subject vehicle and the obstacle information; and
announcing announcement information to a driver of the subject vehicle so that the driver of the subject vehicle can visually confirm the announcement information, the announcement information including at least one of a disappearance range that is to disappear from the second range after the predetermined time and an additional range that is to be added to the second range after the predetermined time.

2. The travel control method according to claim 1, wherein the announcement information includes the second range after the predetermined time.

3. The travel control method according to claim 2, wherein the announcement information is announced to the driver of the subject vehicle such that, when the disappearance range has a size that is less than a predetermined range, the disappearance range or the second range after the predetermined time is displayed in a first form and, when the disappearance range has a size that is the predetermined range or more, the disappearance range or the second range after the predetermined time is displayed in a second form different from the first form.

4. The travel control method according to claim 2, wherein the announcement information is announced to the driver of the subject vehicle such that, when the second range after the predetermined time has a size that is a predetermined range or more, the second range after the predetermined time is displayed in a first form and, when the second range after the predetermined time has a size that is less than the predetermined range, the second range after the predetermined time is displayed in a second form different from the first form.

5. The travel control method according to claim 2, wherein the announcement information is announced to the driver of the subject vehicle such that, when a rate with which the second range becomes small is a predetermined rate or more, the disappearance range or the second range after the predetermined time is displayed in a first form and, when the rate with which the second range becomes small is less than the predetermined rate, the disappearance range or the second range after the predetermined time is displayed in a second form different from the first form.

6. The travel control method according to claim 1, comprising:
estimating the second range after a predetermined time; and
permitting the subject vehicle to change lanes when the second range after the predetermined time completely includes the first range.

7. A travel control apparatus comprising:
a first detector configured to detect an obstacle around a subject vehicle traveling in a first lane;
a second detector configured to detect a second lane adjacent to the first lane; and a controller configured to:
  set a first range at a target position for lane change in the second lane, the first range having a size equal to or larger than a size which the subject vehicle occupies on a road surface;
  detect a range in the second lane as a second range, the range in the second lane being located at a side of the subject vehicle, the obstacle being absent in the range in the second lane; and
  permit the subject vehicle to change lanes when the second range completely includes the first range, the controller being further configured to:
  detect a travel state of the subject vehicle including a position and a speed of the subject vehicle;
  acquire obstacle information including a position and a speed of the obstacle;
  estimate the second range after a predetermined time on a basis of the travel state of the subject vehicle and the obstacle information; and
  announce announcement information to a driver of the subject vehicle so that the driver of the subject vehicle can visually confirm the announcement information, the announcement information including at least one of a disappearance range that is to disappear from the second range after the predetermined time and an additional range that is to be added to the second range after the time predetermined.

\* \* \* \* \*